US012729581B2

(12) United States Patent
Meyer et al.

(10) Patent No.: US 12,729,581 B2
(45) Date of Patent: Sep. 8, 2026

(54) SAFE AND SAFE LOCKING MECHANISM

(71) Applicant: Steelhead Outdoors LLC, Shakopee, MN (US)

(72) Inventors: Corey Daniel Meyer, Shakopee, MN (US); Charles Gordon Pehrson, Prior Lake, MN (US)

(73) Assignee: STEELHEAD OUTDOORS LLC, Shakopee, MN (US)

( * ) Notice: Subject to any disclaimer, the term of this patent is extended or adjusted under 35 U.S.C. 154(b) by 13 days.

(21) Appl. No.: 18/956,457

(22) Filed: Nov. 22, 2024

(65) Prior Publication Data

US 2025/0198223 A1 Jun. 19, 2025

Related U.S. Application Data

(60) Provisional application No. 63/609,457, filed on Dec. 13, 2023.

(51) Int. Cl.

| | |
|---|---|
| ***E05G 1/02*** | (2006.01) |
| ***E05B 65/00*** | (2006.01) |
| ***E05G 1/024*** | (2006.01) |
| ***E05G 1/026*** | (2006.01) |
| ***E05G 1/04*** | (2006.01) |

(52) U.S. Cl.

CPC ............ *E05G 1/02* (2013.01); *E05B 65/0075* (2013.01); *E05G 1/024* (2013.01); *E05G 1/026* (2013.01); *E05G 1/04* (2013.01)

(58) Field of Classification Search

CPC .. E05G 1/00; E05G 1/02; E05G 1/024; E05G 1/026; E05B 65/0075; E05B 1/04

See application file for complete search history.

(56) References Cited

U.S. PATENT DOCUMENTS

| | | | | |
|---|---|---|---|---|
| 3,692,015 | A | 9/1972 | Chase et al. | |
| 4,174,711 | A | 11/1979 | Laing et al. | |
| 4,240,397 | A | 12/1980 | Seidel | |
| 4,272,137 | A | 6/1981 | Rothhaas et al. | |
| 4,426,935 | A | 1/1984 | Nikoden, Jr. | |
| 4,741,276 | A | 5/1988 | Pollock | |
| 5,209,168 | A * | 5/1993 | Chapron | E05C 9/00 70/144 |
| 6,415,557 | B1 | 7/2002 | Mccalley | |
| 6,438,906 | B1 | 8/2002 | Komarowski et al. | |

(Continued)

FOREIGN PATENT DOCUMENTS

| | | |
|---|---|---|
| CN | 103758434 A | 4/2014 |
| CN | 205444544 U | 8/2016 |
| EP | 2072741 A1 | 6/2009 |

*Primary Examiner* — Christopher J Boswell

(74) *Attorney, Agent, or Firm* — Fredrikson & Byron, P.A.

(57) ABSTRACT

Certain embodiments provide a safe comprising a plurality of panels. The plurality of panels can include a top panel, a base panel, a first side panel, a second side panel, a rear panel and a door. The first side panel includes a vertical receiving bar having a plurality of slots. The door includes a vertical protruding bar having a plurality of protrusions that extend into the plurality of slots. A handle assembly is provided that moves the vertical protruding bar between a raised configuration and a lowered configuration. A locking assembly is provided that locks the vertical protruding bar in the lowered configuration.

31 Claims, 24 Drawing Sheets

(56) References Cited

U.S. PATENT DOCUMENTS

| | | | | |
|---|---|---|---|---|
| 6,786,009 | B1 * | 9/2004 | McGunn | E05G 1/024 52/36.2 |
| 6,871,602 | B2 * | 3/2005 | McCracken | E05B 65/0075 292/159 |
| 7,003,991 | B2 * | 2/2006 | Alizade | E05G 1/024 70/133 |
| 7,156,298 | B2 * | 1/2007 | McCracken | E05B 65/0075 902/8 |
| 8,327,778 | B2 | 12/2012 | Dellorusso, Jr. | |
| 8,474,386 | B2 | 7/2013 | Dellorusso, Jr. | |
| 10,316,573 | B2 * | 6/2019 | Green | E05B 65/0075 |
| 11,313,169 | B2 * | 4/2022 | Meyer | E05G 1/026 |
| 11,767,703 | B2 * | 9/2023 | Alarcon | E05G 1/04 109/59 R |
| 12,326,034 | B2 * | 6/2025 | Suggs | E05G 1/04 |
| 2004/0177794 | A1 * | 9/2004 | DuBois | G07F 9/10 109/24.1 |
| 2005/0284344 | A1 | 12/2005 | Alizade | |
| 2006/0180059 | A1 | 8/2006 | Martin | |
| 2012/0192769 | A1 | 8/2012 | Chiang | |
| 2016/0084563 | A1 | 3/2016 | Ghiraldi | |
| 2016/0273259 | A1 | 9/2016 | Debaldo | |

* cited by examiner

SAFE AND SAFE LOCKING MECHANISM

RELATED APPLICATION

The present application is a non-provisional application of U.S. provisional patent No. 63/609,457, the entire contents of which are incorporated herein by reference.

FIELD OF THE INVENTION

This disclosure relates generally to the field of enclosed storage containers that include a security lock, such as safes, lockers, cabinets, vaults, lockboxes, strongboxes, chests and the like.

BACKGROUND OF THE INVENTION

Security safes are often used for the storage of guns, ammunition, important papers and other valuables or items. When a person purchases a safe it will typically come as a fully assembled unit. Completed units can be extremely heavy as well as sized to make their movement around corners and through doors difficult. It would be desirable to provide a modular safe that can be shipped in a modular form and assembled onsite. Such a modular safe can also be disassembled and reassembled as needed. It would also be desirable to provide an enhanced locking mechanism compatible for use with a modular safe. Such an enhanced locking mechanism would have excellent security while also being capable of being shipped and assembled in a modular form. It would also be desirable to provide a modular safe that can be formed of simpler materials, while also retaining excellent security. Further, it would be desirable to provide an enhanced locking mechanism that can be used with any kind of safe.

SUMMARY OF THE INVENTION

Figure 1:
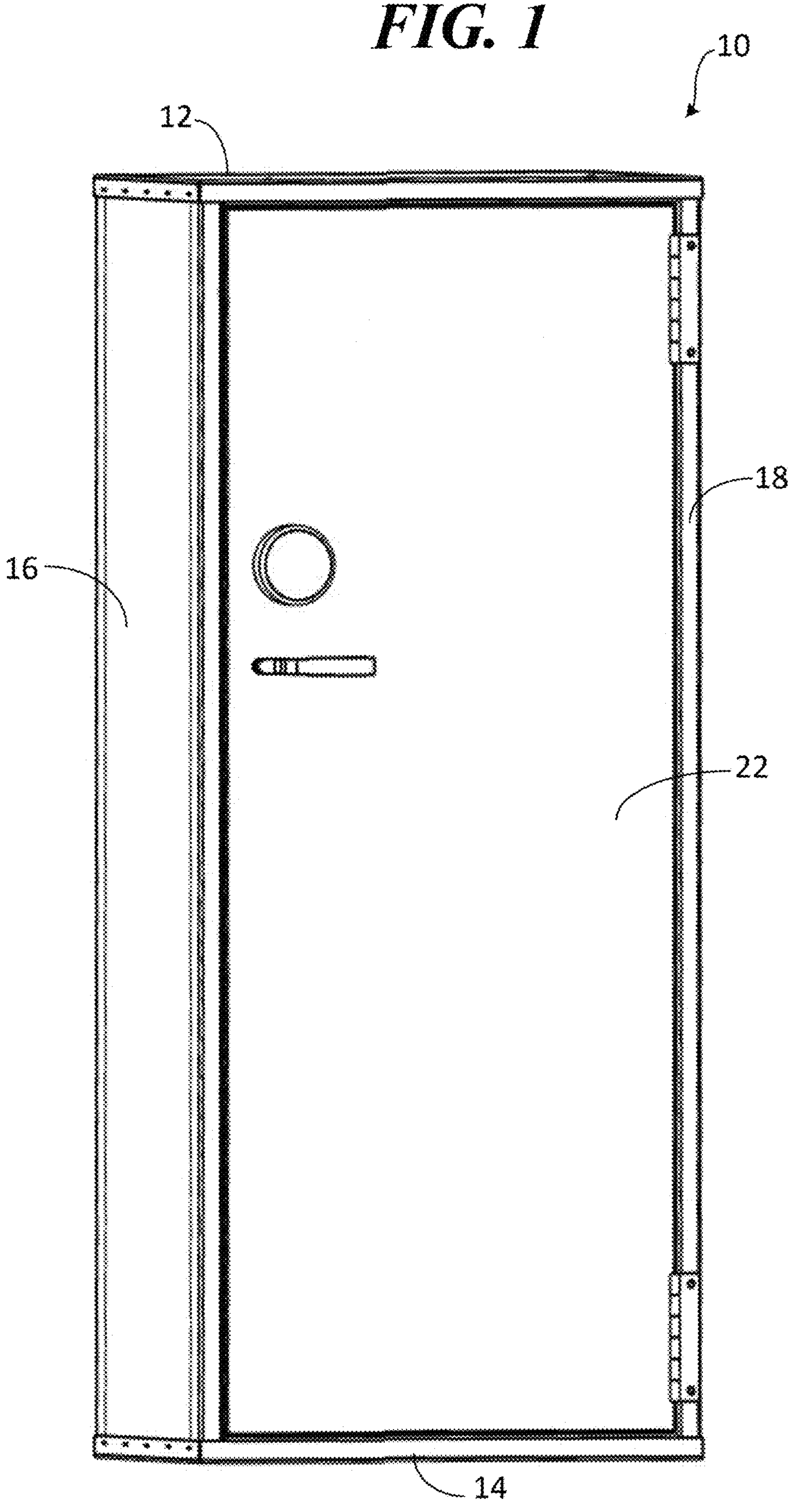
FIG. 1 is a front perspective view of a safe in a closed configuration according to an embodiment.

Certain embodiments provide a safe comprising a plurality of panels. The plurality of panels can include a top panel, a base panel, a first side panel, a second side panel, a rear panel and a door. In some cases, each panel comprises a plurality of walls formed of a single metallic material. In certain cases, the plurality of walls are devoid of an insulation layer. In some cases, the safe is a modular safe and the plurality of panels can be removably secured together to form an enclosed interior space. In other cases, the safe is a traditional safe and the top panel, the base panel, the first side panel, the second side panel and the rear panel are an integral structure.

The first side panel includes a plurality of slots. In some cases, the first side panel includes a vertical receiving bar that includes the plurality of slots. For example, in certain cases, the first side panel includes a first side panel side wall and a first side panel front wall. The vertical receiving bar can be spaced inward the first side panel side wall and inward the first side panel front wall. In some cases, the vertical receiving bar is integral to the first side panel.

The door can include a door front wall, a door side wall and a vertical protruding bar. The vertical protruding bar can be spaced inward the door front wall and spaced inward the door side wall. The vertical protruding bar includes a plurality of protrusions spaced along a longitudinal length of the vertical protruding bar. The plurality of protrusions can be sized and shaped to insert into the plurality of slots on the vertical receiving bar. The plurality of protrusions can be configured as downward-facing hooks that extend outward from the vertical protruding bar.

The vertical protruding bar can also be movable (e.g., slidable) between a raised configuration and a lowered configuration. The vertically protruding bar can also be a single integral piece such that the plurality of protrusions move together when the vertical protruding bar moves between the raised configuration and the lowered configuration.

In some cases, the door includes a door interior wall that is parallel to and spaced inward the door side wall, and the vertical protruding bar can be fixed to the door interior wall such that it is movable (e.g., slidable) between the raised configuration and the lowered configuration relative to the door interior wall. Also, in some cases, the includes a rear wall and the plurality of protrusions extend through indents in the rear wall.

The plurality of protrusions can be configured to move freely into and out of the plurality of slots of the first side panel when the vertical protruding bar is in the raised configuration. Also, the plurality of protrusions can be configured to be locked within the plurality of slots when the vertical protruding bar is in the lowered configuration. In some cases, the plurality of protrusions are configured as downward-facing hooks, the downward-facing hooks including bottom points. The bottom points can move freely into and out of the plurality of slots when the vertical protruding bar is in the raised configuration. Also, the bottom points cannot move out of the plurality of slots when the vertical protruding bar is in the lowered configuration. For example, the bottom points abut a surface of the vertical receiving bar and cannot move out of the plurality of slots.

A handle assembly can also be provided on the door and be operably connected to the vertical protruding bar to move the vertical protruding bar between the raised configuration and the lowered configuration. The vertical protruding bar can include a row of threading holes spaced longitudinally along a length of the vertical protruding bar. The handle assembly can also include a plurality of teeth that engage the row of threading holes to move the vertical protruding bar between the raised configuration and the lowered configuration.

A lock assembly can also be provided on the door and be operably connected to lock the vertical protruding bar in the lowered configuration. The vertical protruding bar can include a bolt recess and the lock assembly can include a bolt that extends into the bolt recess when the vertical protruding bar is in the lowered configuration, thereby locking the vertical protruding bar in the lowered configuration.

The vertical protruding bar can also include a bottom stake portion that is sized and shaped to be received by a staking hole in the base panel. In some cases, the base panel includes a base panel side wall, a base panel front wall, and a base panel bottom wall. The staking hole can be spaced inward the base panel side wall, spaced inward the base panel front wall, and spaced higher than the base panel bottom wall.

The safe therefore has an open configuration, a closed configuration and a locked configuration. In the open configuration, the vertical protruding bar is in the raised configuration and the bottom stake portion is not received by the staking hole. In the closed configuration, the plurality of protrusions extend into the plurality of slots, the vertical protruding bar is in the lowered configuration and the bottom stake portion is received by the staking hole. In the locked configuration, the plurality of protrusions extend into the plurality of slots, the vertical protruding bar is in the lowered configuration, the bottom stake portion is received by the staking hole and the locking assembly locks the vertical protruding bar in the lowered configuration.

In some embodiments, the door also includes a plurality of hooks spaced inward the front door wall and the second side panel comprises a vertical hook bar. In certain cases, the second side panel includes a second side panel side wall and a second side panel front wall, and the vertical hook bar is spaced inward the second side panel side wall and spaced inward the second side panel front wall. In the safe the open configuration, the plurality of hooks are not engaged by the vertical hook bar. In the closed configuration and in the locked configuration, the plurality of hooks are engaged by the vertical hook bar.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The present invention provides a modular safe 10. As used herein, the term "safe" refers to any enclosed storage container that includes a security lock. The term "safe" includes but is not limited to cabinets, lockers, vaults, lockboxes, strongboxes, chests and the like. The modular safe 10 is designed to store valuable items and in many cases stores firearms and related accessories, such as ammunition. In certain embodiments, the safe is a modular safe.

Figure 2:
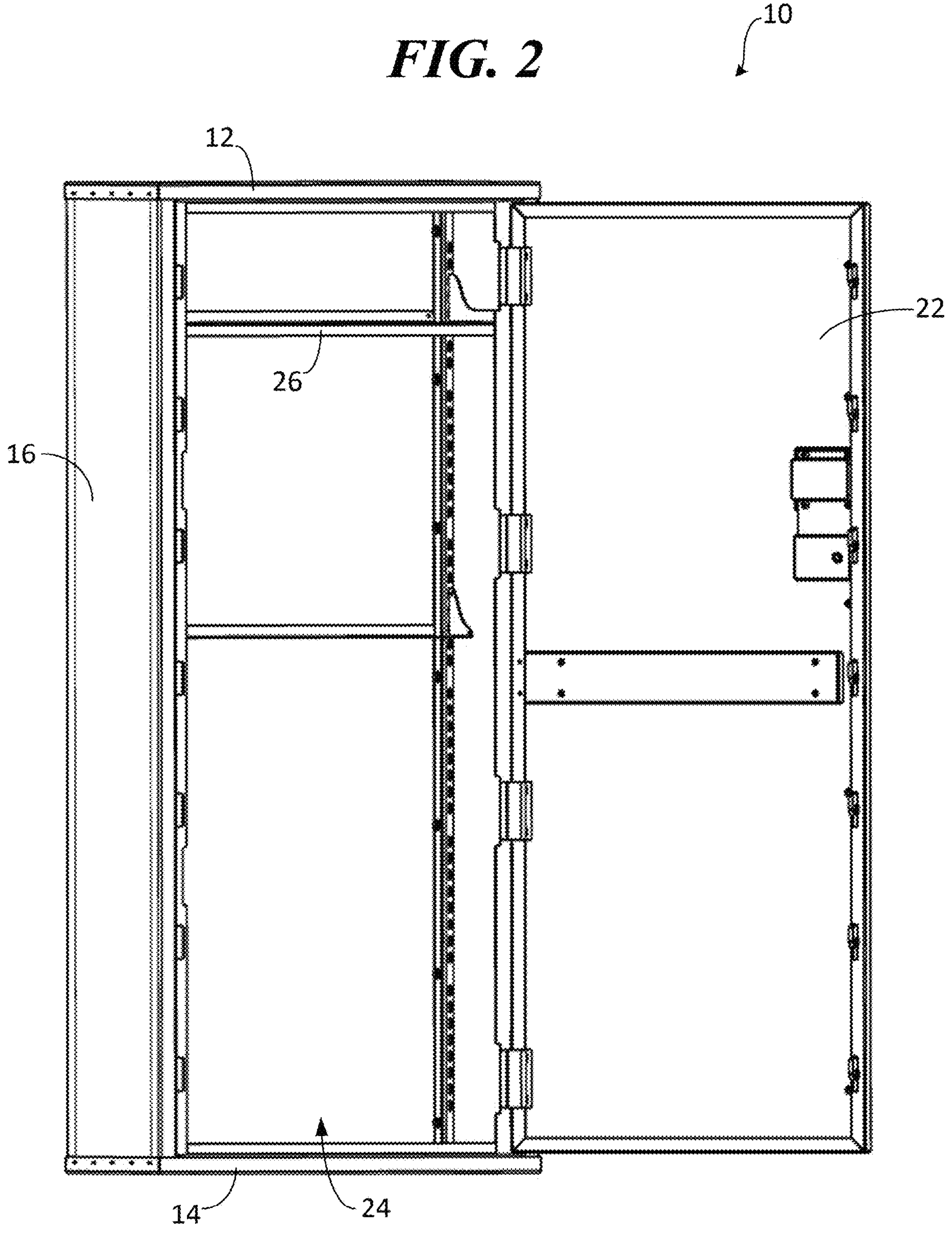
FIG. 2 is a front perspective view of a safe in an open configuration according to an embodiment.
Figure 3:
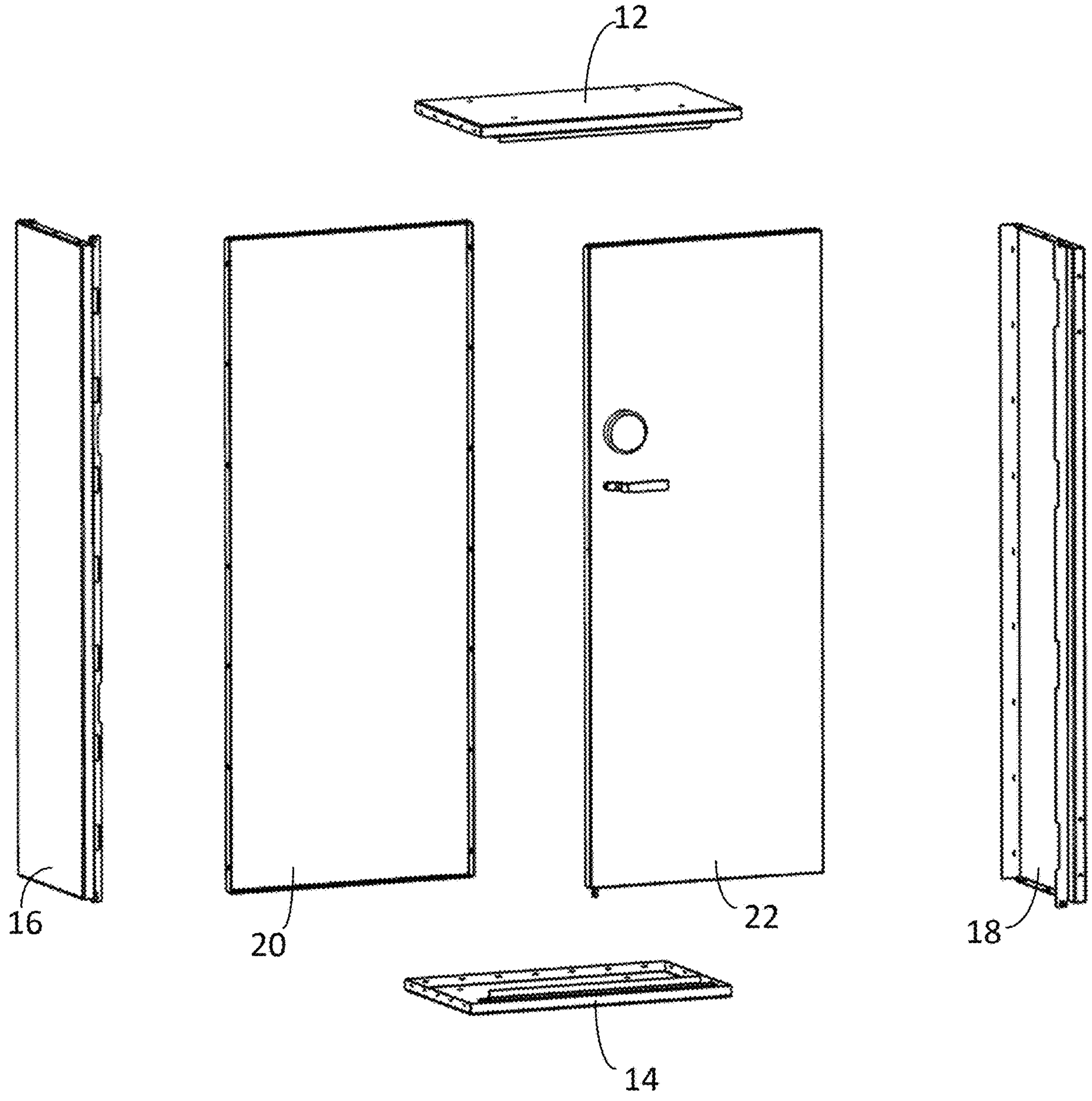
FIG. 3 is an exploded view of a certain components of a safe according to an embodiment.
Figure 4:
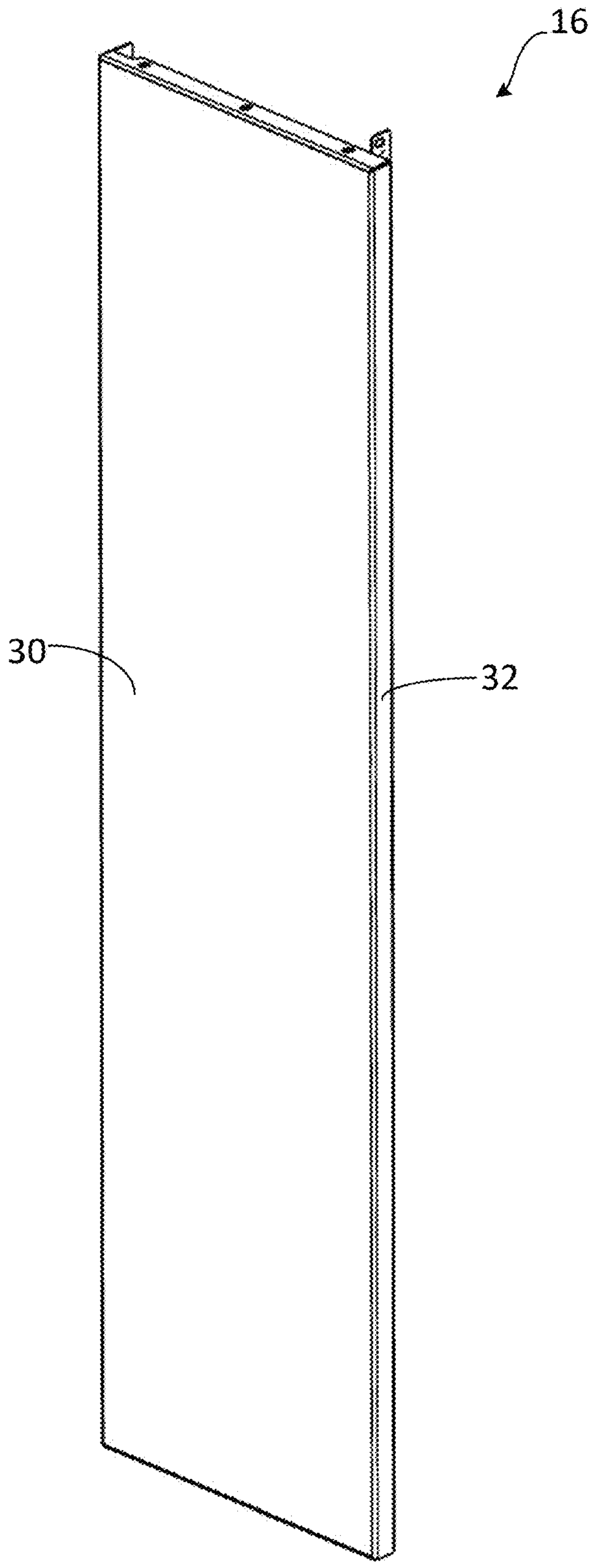
FIG. 4 is side perspective view of certain components of a first side panel according to an embodiment.
Figure 5:
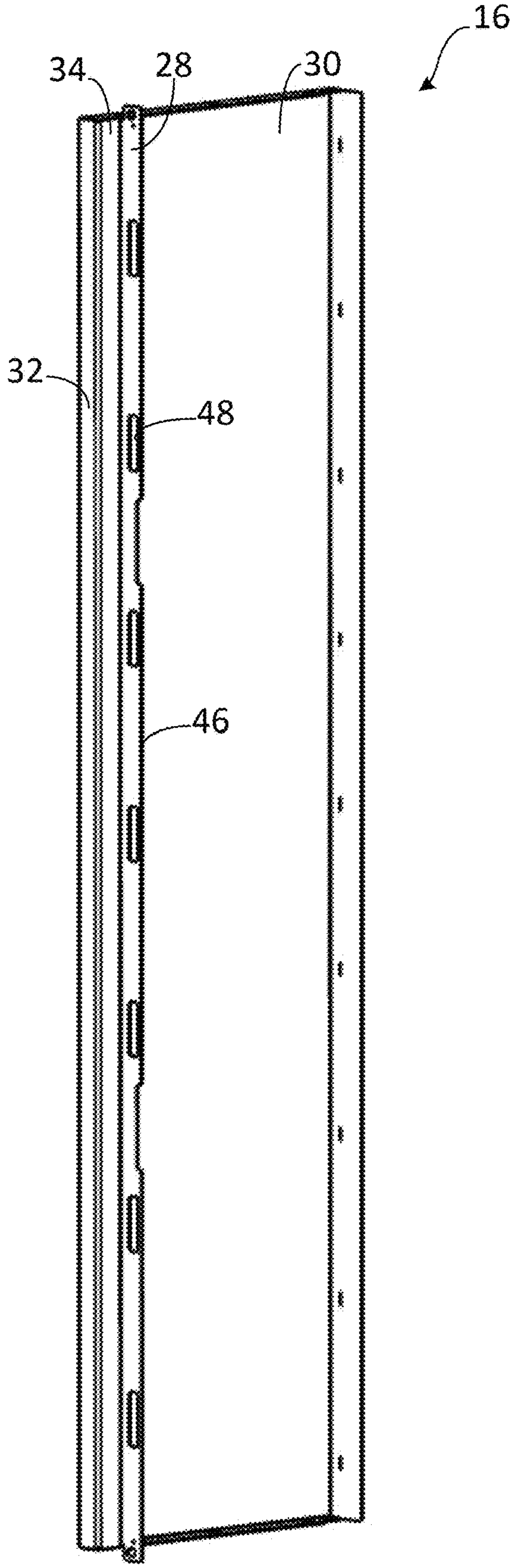
FIG. 5 is another side perspective view of certain components of a first side panel according to an embodiment.
Figure 6:
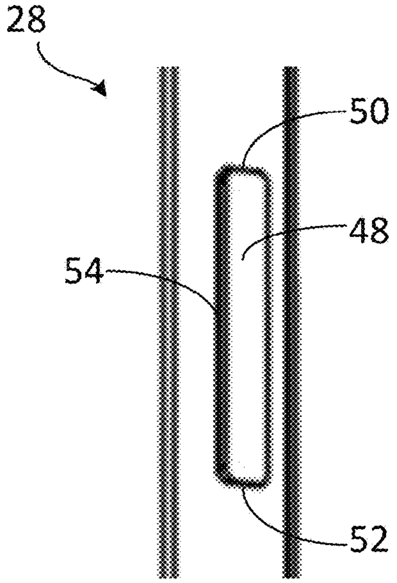
FIG. 6 is an enlarged cutout view of a slot of a vertical receiving bar of a first side panel according to an embodiment.

FIGS. 1-2 illustrate the modular safe 10 in an assembled configuration and FIG. 3 illustrates the modular safe 10 in a disassembled configuration. Further, FIG. 1 illustrates the modular safe 10 in a closed configuration and FIG. 2 illustrates the modular safe 10 in an open configuration.

The modular safe 10 generally includes a top panel 12, a base panel 14, a first side panel 16, a second side panel 18, a rear panel 20 and a door 22 that form an enclosed interior 24. One or more optional shelves 26 can also be provided within the enclosed interior 24.

The modular safe 10 can be shipped in modular form and assembled quickly onsite. In some cases, the safe 10 is shipped with components in a disassembled configuration as shown in FIG. 3. In the disassembled configuration, at least the top panel 12, base panel 14, first side panel 16, second side panel 18, rear panel 20, door 22 and optional shelves 26 are provided as separate components.

Once onsite, the top panel 12, the base panel 14, the first side panel 16, the second side panel 18, the rear panel 20, door 22 and optional shelves 26 can be assembled together to form the safe 10 as shown in FIGS. 1-2. When it is desired to move the safe 10 to a new location, the components can be again disassembled into separated components as shown in FIG. 3 and then later reassembled.

The panels can be assembled together using any assembly mechanism or fastening mechanism known in the art. For example, the panels can be assembled together using threaded fasteners such as bolts and threads or using nonthreaded fasteners such as locks and pins or clips and tabs. In certain cases, the panels include fastener rails (not shown) that include threaded inserts. Bolts can be inserted into the threaded inserts to assemble panels together. The assembly mechanism or fastening mechanism is not limited.

Once assembled, the first side panel 16 is connected to the rear panel 20, the rear panel 20 is connected to the second side panel 18, and the second side panel 18 is hingedly connected to the door 22. The door 22 moves between a closed configuration as shown in FIG. 1 and an open configuration as shown in FIG. 2. The first side panel 16 and the second side panel 18 are generally parallel to each other. Likewise, when the door 22 is in a closed configuration, the door 22 is generally parallel to the rear panel 20. The door 22 locks and unlocks to the first side panel 16 as described herein.

The panels of the safe 10 can comprise a plurality of walls. Generally, each wall in the plurality comprises a single layer. In other words, the walls do not include multiple layers of material. For example, the walls do not include a layer of insulation between other layers. In many cases, each wall comprises a single layer of a metallic material. In some cases, each wall comprises a single layer of carbon steel. Such a simple construction further simplifies the modularity of the safe 10 and makes it easier to ship and assemble onsite. At the same time, the safe 10 includes advantageous locking features described herein to maintain excellent security.

FIGS. 4-7 illustrate certain components of the first side panel 16. The first side panel 16 includes a plurality of walls and a vertical receiving bar 28. The vertical receiving bar 28 is a vertical bar that extends vertically along a longitudinal axis of the first side panel 16.

The plurality of walls can include a side wall 30, a front wall 32 and a connecting wall 34. The side wall 30 is connected to the front wall 32 via a corner 36 and the front wall 32 is connected to the connecting wall 34 via another corner 38, and the connecting wall 34 is connected to the vertical receiving bar 28 via another corner 40.

The side wall 30 and the connecting wall 34 are parallel while the front wall 32 and the vertical receiving bar 28 are parallel. The vertical receiving bar 28 is therefore perpendicular to the side wall 30 and the connecting wall 34. The connecting wall 34 also inwardly spaces the vertical receiving bar 28 from the front wall 32.

In many cases, the vertical receiving bar 28 is integral to the first side panel 16. For example, the vertical receiving bar 28 can be formed along with other components or it can be later welded to the first side panel 16. By making more components of the first side panel 16 integral, the security of the safe 10 is bolstered. Likewise, when more components are integral, assembly of the modular safe 10 onsite is simplified.

The vertical receiving bar 28 includes a front surface 42, a rear surface 44 and an exposed side edge 46. The front surface 42 faces forward and the rear surface 44 faces rearward. The exposed side edge 46 is the portion of the vertical receiving bar 28 furthest from the side wall 30.

Figure 7:
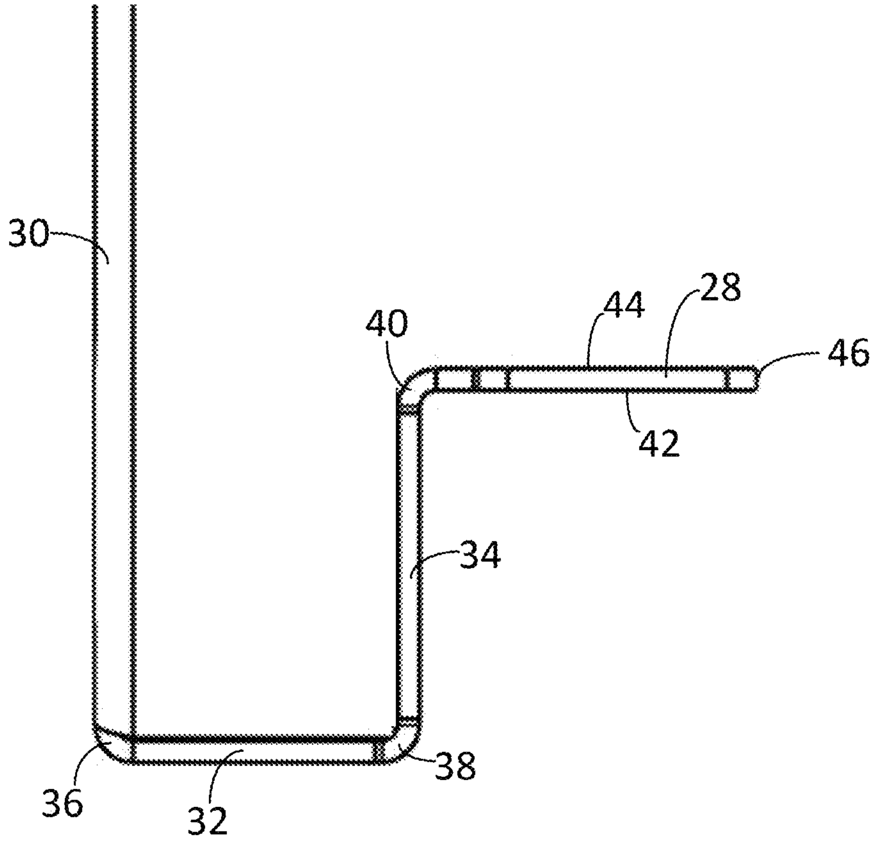
FIG. 7 is a top sectional view of certain components of a first side panel according to an embodiment.

As best shown in FIG. 7, the vertical receiving bar 28 is positioned to be spaced inward the side wall 30 and inward the front wall 32. This inward spacing of the vertical receiving bar 28 further enhances security of the safe 10 since it makes it harder to access the vertical receiving bar 28 when the safe 10 is locked.

The vertical receiving bar 28 includes a plurality of slots 48. The plurality of slots 48 extend vertically along the longitudinal length of the vertical receiving bar 28. In some cases, the plurality of slots 48 includes seven slots. However, skilled artisans will understand that other numbers of slots 48 can be used. The slots 48 can also be spaced along the longitudinal length of the vertical receiving bar 28. In some cases, the slots 48 are positioned to be equidistant from one another.

Each slot 48 also has a generally rectangular shape with a top 50, a bottom 52 and two sides 54. The sides 54 have a length that extend vertically along a longitudinal axis of the vertical receiving bar 28. Each slot 48 also extends entirely through the vertical receiving bar 28 from the front surface 42 to the rear surface 44.

Figure 8:
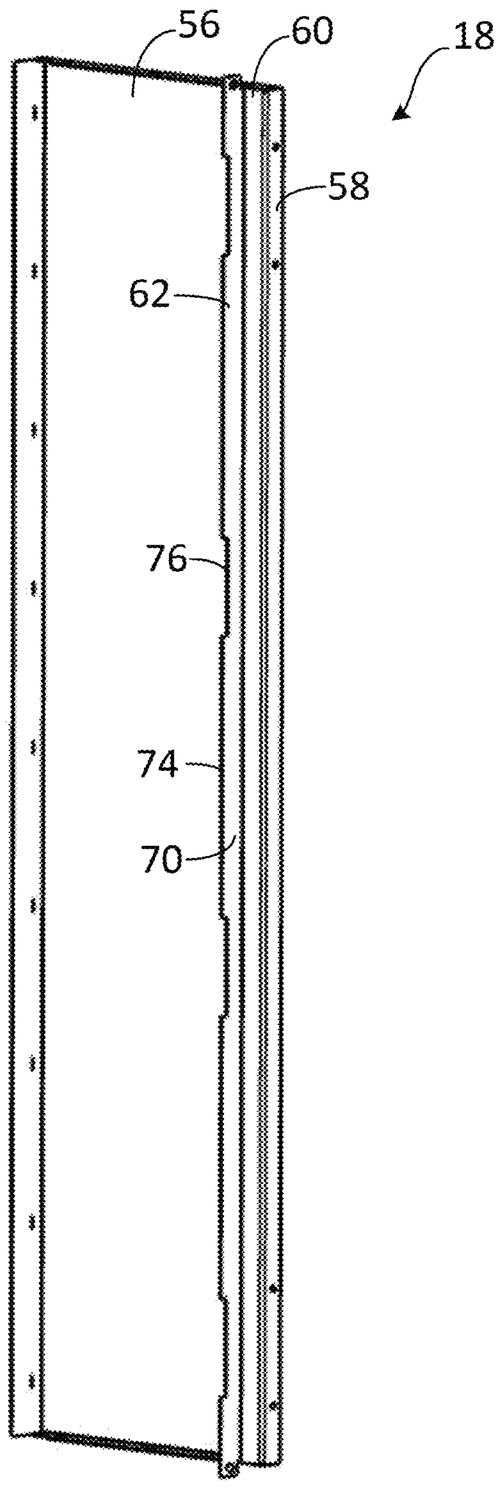
FIG. 8 is a side perspective view of certain components of a second side panel according to an embodiment.
Figure 9:
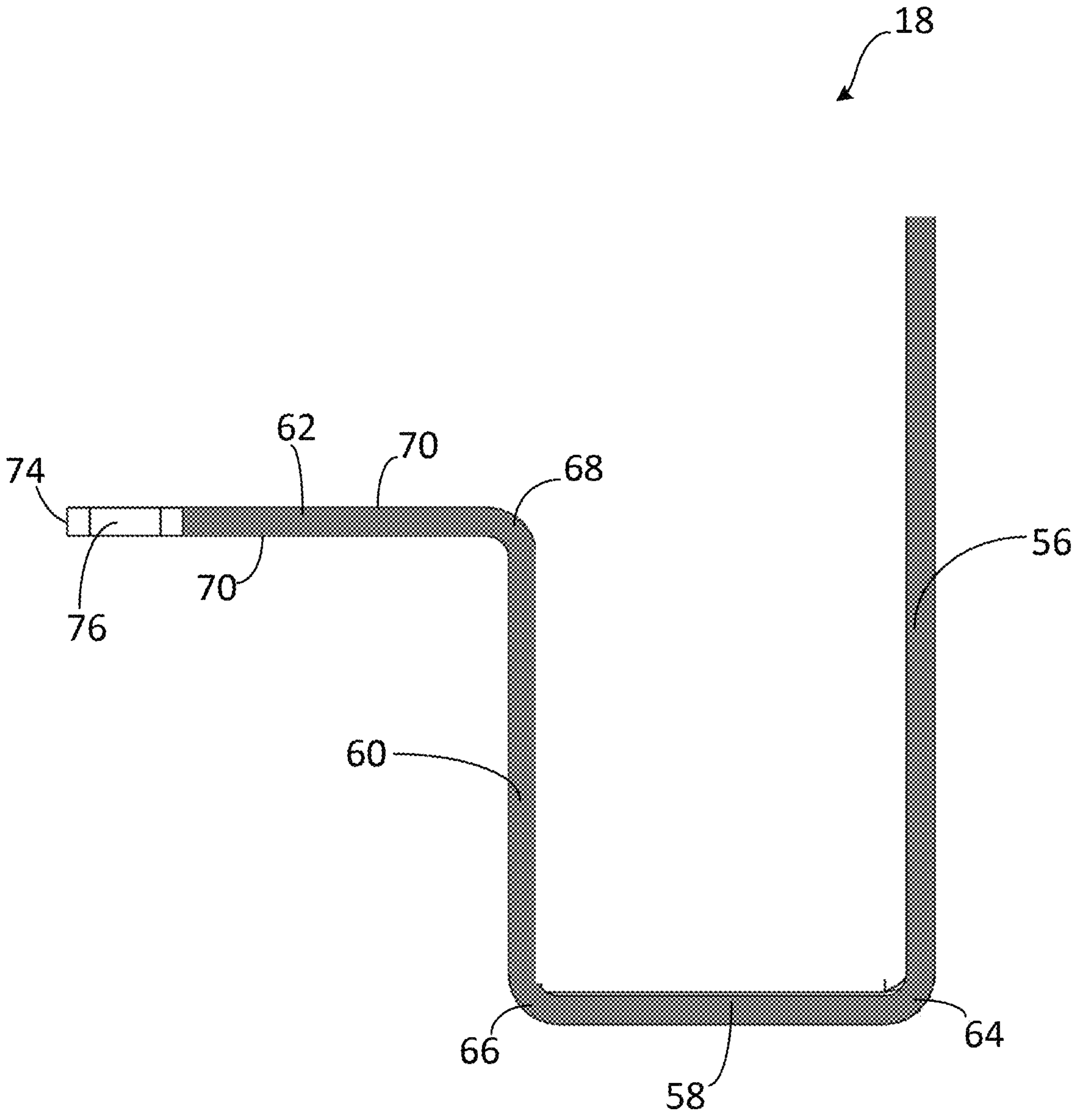
FIG. 9 is a top sectional view of certain components of a second side panel according to an embodiment.

FIGS. 8-9 illustrate certain components of the second side panel 18. The second side panel 18 includes a side wall 56, a front wall 58, a connecting wall 60 and a vertical hook bar 62. The side wall 56 is connected to the front wall 58 via a corner 64 and the front wall 58 is connected to the connecting wall 60 via another corner 66, and the connecting wall 60 is connected to the vertical hook bar 62 via another corner 68. In many cases, these components are all integral to the second side panel 18.

The side wall 56 and the connecting wall 60 are parallel while the front wall 58 and the vertical hook bar 62 are parallel. The vertical hook bar 62 is therefore perpendicular to the side wall 56 and the connecting wall 60. The connecting wall 60 also inwardly spaces the vertical hook bar 62 from the front wall 58.

The vertical hook bar 62 includes a front surface 70, a rear surface 72 and an exposed side edge 74. The front surface 42 faces forward and the rear surface 44 faces rearward. The exposed side edge 74 is the portion of the vertical hook bar 62 furthest from the side wall 56. The exposed side edge 74 includes one or more indents 76 sized and shaped to engage with hooks on a door 22 as described herein. Here too, the vertical hook bar 62 can be integral to the second side panel 18.

Figure 10:
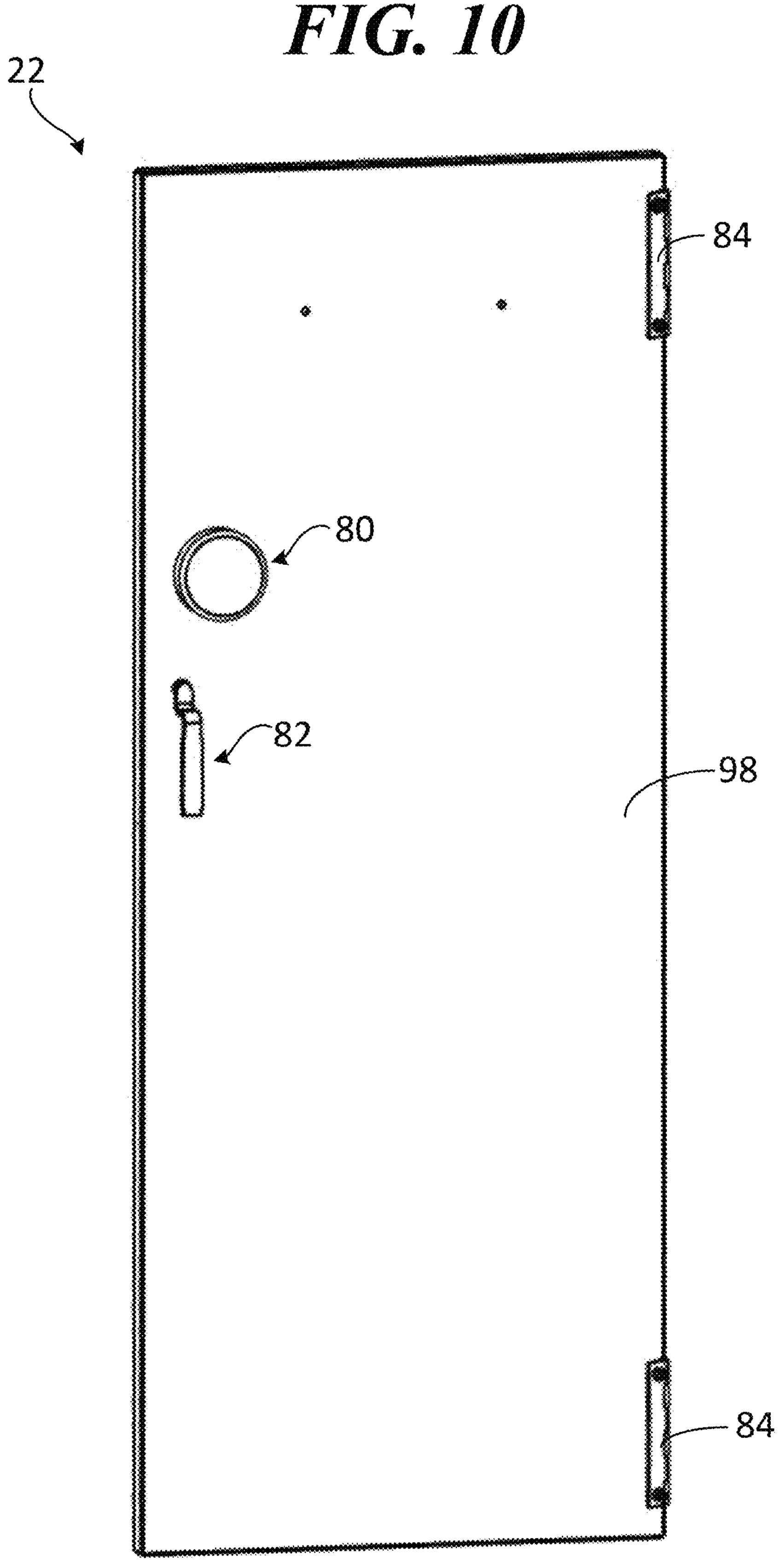
FIG. 10 is a front perspective view of certain components of a door according to an embodiment.
Figure 11:
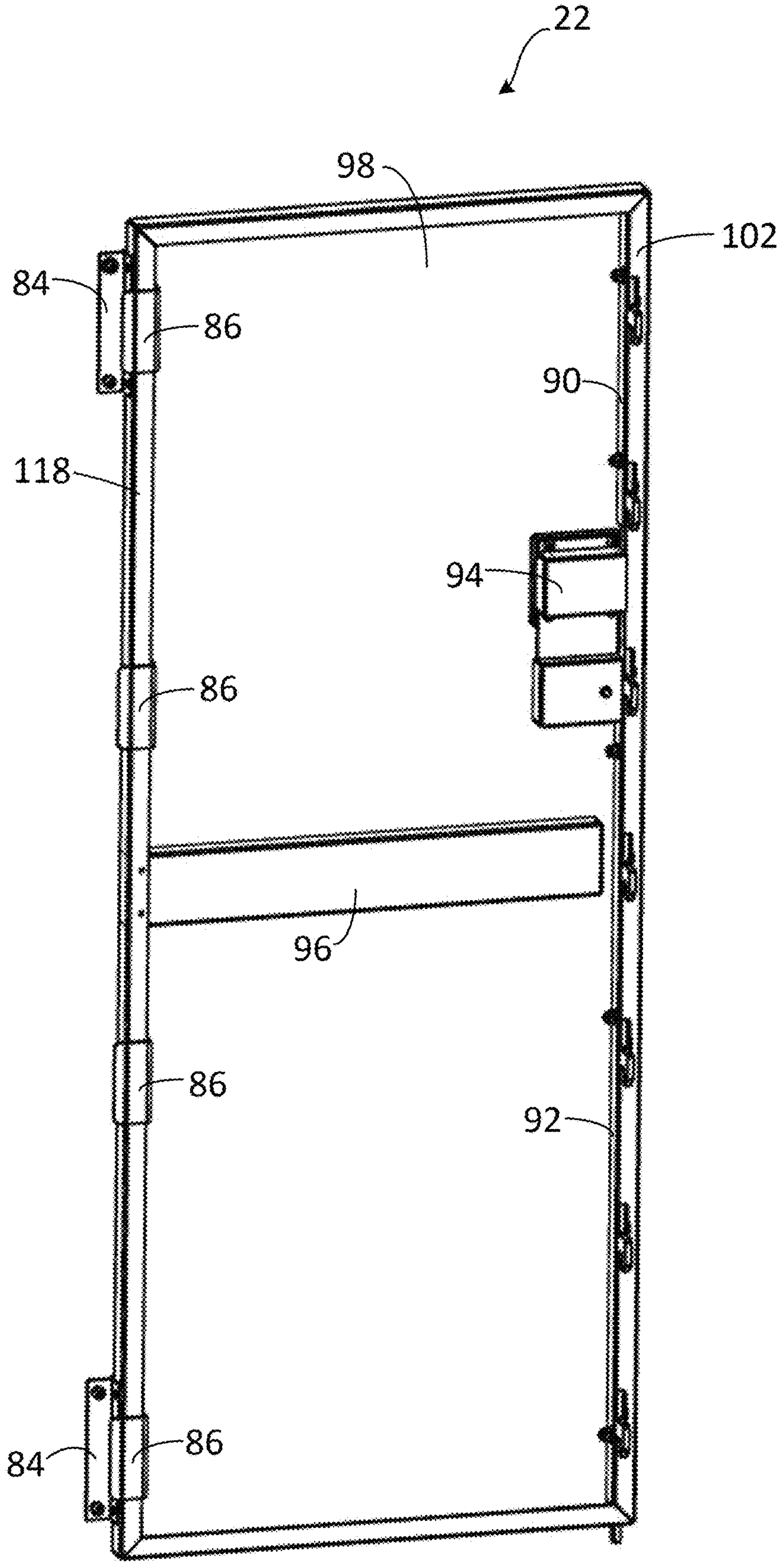
FIG. 11 is a rear perspective view of certain components of a door according to an embodiment.
Figure 12:
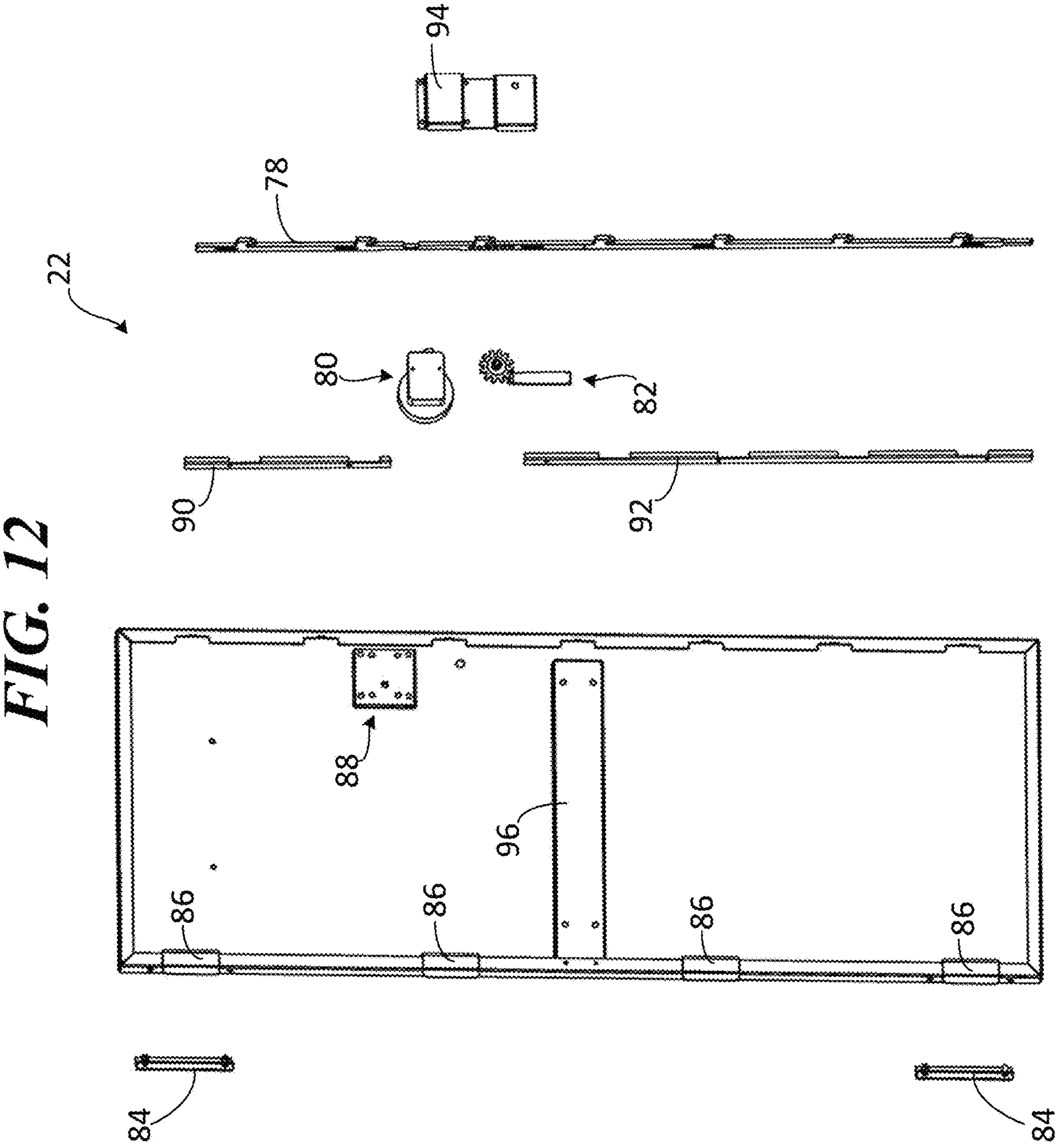
FIG. 12 is an exploded view of certain components of a door according to an embodiment.

FIGS. 10-12 illustrate certain components of the door 22. The door 22 includes a plurality of walls, a vertical protruding bar 78, a lock assembly 80, a handle assembly 82, hinges 84 and hooks 86. The door 22 can also include a mounting assembly 88, an upper cover bar 90, a lower cover bar 92, a cover housing 94 and a support bar 96. Each component will be discussed in detail.

The hinges 84 connect the door 22 to the second side panel 18. In the illustrated embodiment, two external hinges 84 are provided. Skilled artisans will understand that any number of hinges 84 can be provided and any known hinge configuration can be used.

The hooks 86 engage with the second side panel 18 to further lock the door 22 to the second side panel 18. If the hinges 84 are removed, the hooks 86 ensure the door 22 still cannot be removed. The hooks 86 can also be integral to the door 22. In some cases, the hooks are welded to the door 22. Four hooks 86 are illustrated but other numbers can be used.

The mounting assembly 88 includes one or more plates that mount components of the lock assembly 80. The upper cover bar 90 and the lower cover bar 92 are positioned to cover and prevent easy access to the vertical protruding bar 78. The cover housing 94 is positioned to cover and prevent access to the lock assembly 80 and handle assembly 82. Use of cover bars 90, 92 and a cover housing 94 helps bolster the security of the safe by restricting access to interior components. A support bar 96 can also be provided. In many cases, the mounting assembly 88 and the support bar 96 can be integral to and welded to the door 22.

Figure 13:
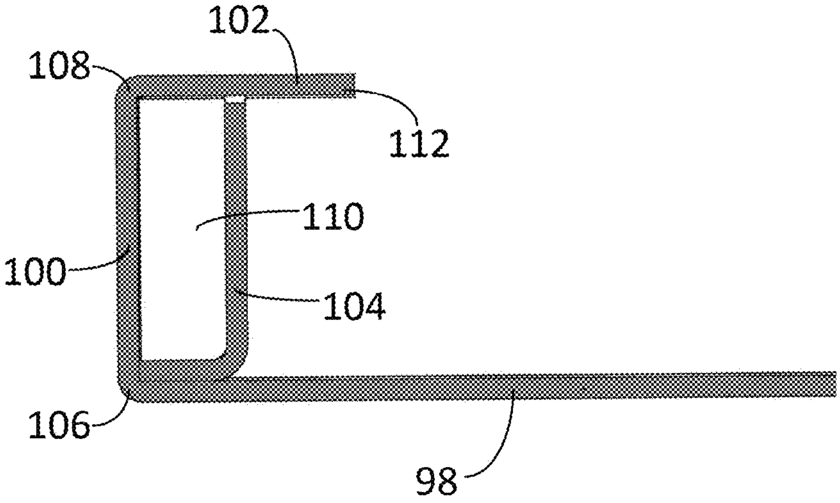
FIG. 13 is a top sectional view of a plurality of walls of a door corner adjacent a first side panel according to an embodiment.

FIG. 13 illustrates a plurality of walls that form the door corner that engages the first side panel 16. The plurality of walls includes a front wall 98, a side wall 100, a rear wall 102 and an interior wall 104. The front wall 98 is connected to the side wall 100 via a corner 106 and the side wall 100 is connected to the rear wall 102 via another corner 108. The rear wall 102 is parallel to and inwardly spaced from the front wall 98. Similarly, the side wall 100 is perpendicular to the front wall 98 and the rear wall 102. In many cases, the front wall 98, the side wall 100 and the rear wall 102 are a single integral structure.

The interior wall 104 can be positioned perpendicularly between the front wall 98 and the rear wall 102 such that it is parallel to the side wall 100. In some cases, the interior wall 104 is spaced inward the side wall 100 by a distance. This spacing provides a hollow space 110 between the side wall 100 and the interior wall 104. In some cases, the interior wall 104 can be an integral component that is welded between the front wall 98 and the rear wall 102.

The rear wall 102 can also include an exposed edge 112, which is the longitudinal edge furthest from the side wall 100. Additionally, the rear wall 102 can also include one or more indents 114 formed in the exposed edge 112. The indents 114 are sized and shaped to receive protrusions on a vertical protruding bar 78 as described herein.

Figure 14:
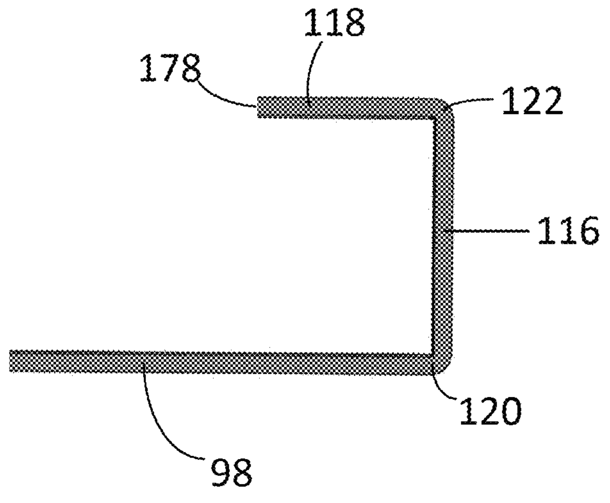
FIG. 14 is a top sectional view of a plurality of walls of a door corner adjacent a second side panel according to an embodiment.

FIG. 14 illustrates a plurality of walls that form the door corner that engages the second side panel 18. The plurality of walls includes a front wall 98, a side wall 116 and a rear wall 118. The front wall 98 is connected to the side wall 116 via a corner 120 and the side wall 116 is connected to the rear wall 118 via another corner 122. The rear wall 118 is parallel to and inwardly spaced from the front wall 98. Similarly, the side wall 116 is perpendicular to the front wall 98 and the rear wall 118. In many cases, the front wall 98, the side wall 116 and the rear wall 118 are a single integral structure.

The rear wall 118 can also include an exposed edge 178, which is the longitudinal edge furthest from the side wall 116. Additionally, the hooks 86 can be integral to the exposed edge 178 and in some cases is welded. The hooks 86 are spaced inward the front wall 98.

The vertical protruding bar 78 is a vertical bar that extends vertically along a longitudinal axis of the door 22. The vertical protruding bar 78 is parallel to the interior wall 104 and is perpendicular to the front wall 98 and the rear wall 102.

Figure 15:
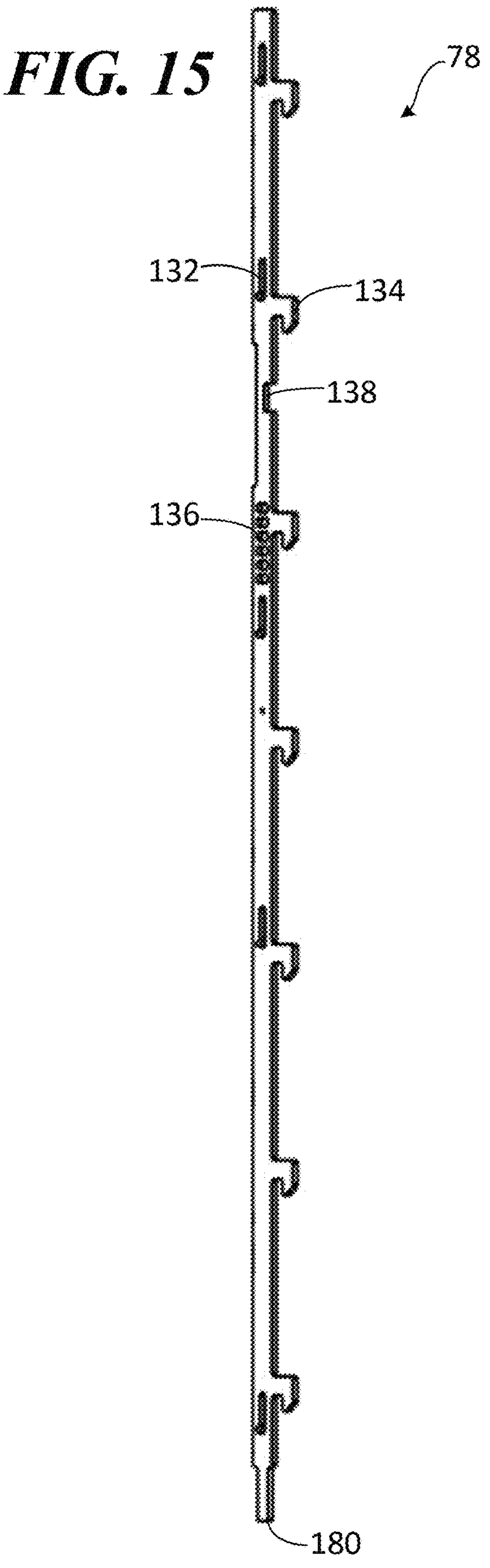
FIG. 15 is a side perspective view of a vertical protruding bar of a door according to an embodiment.
Figure 16:
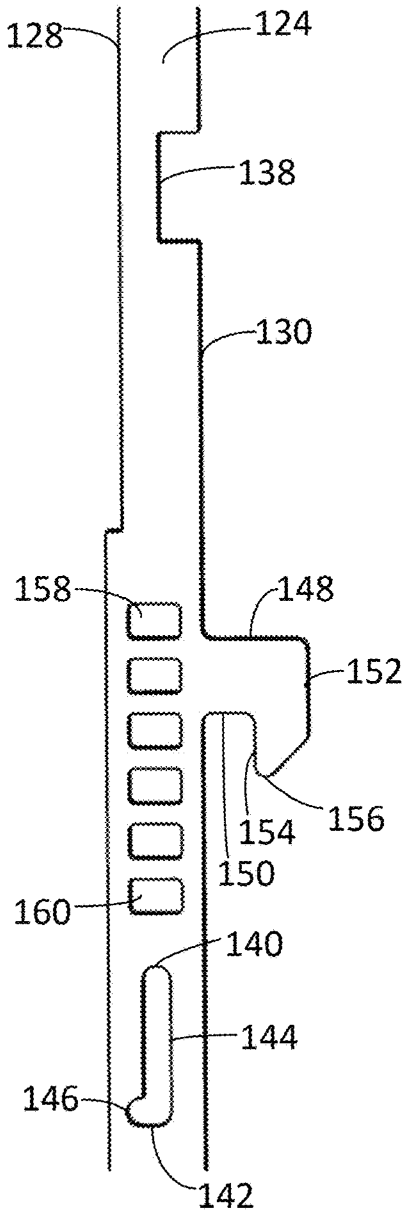
FIG. 16 is an enlarged cutout view of a section of a vertical protruding bar of a door according to an embodiment.

FIGS. 15-16 illustrate certain components of the vertical protruding bar 78. The vertical protruding bar 78 includes a first side surface 124, a second side surface 126, a front surface 128 and a rear surface 130. The vertical protruding bar 78 also includes a plurality of slots 132, a plurality of protrusions 134, a row of threading holes 136, a bolt recess 138 and a bottom stake portion 180. In many cases, the entire vertical protruding bar 78 is a single integral structure. Also, the vertical protruding bar 78 can comprises the same materials as the panels of the safe 10. In some cases, both the vertical protruding bar 79 and the panels comprise carbon steel.

The first side surface 124 and the second side surface 126 are perpendicular to the front wall 98. The front surface 128 is parallel to the front wall 98. The front surface 128 also faces the front wall 98 while the rear surface 130 faces away from the front wall 98.

The plurality of slots 132 can be spaced along the longitudinal length of the vertical protruding bar 78. Each slot 132 extends entirely through the vertical protruding bar 78 from the first side surface 124 to the second side surface 126. Each slot 132 also has a generally rectangular shape with a top 140, a bottom 142 and two sides 144. The sides 144 have a length that extends vertically for a distance along a longitudinal axis of the vertical protruding bar 78. The bottom 142 can also include side extension 146.

The plurality of protrusions 134 are also spaced along a longitudinal length of the vertical protruding bar 78. A selected number of protrusions 134 are provided to match the number of receiving slots 48 on the vertical receiving bar 28 of the first side panel 16. In some cases, the plurality of protrusions 134 includes seven protrusions to match seven receiving slots 48, as this provides seven locking points between the front door 22 and first side panel 16, thereby increasing security. However, skilled artisans will understand that other numbers of protrusions 134 and corresponding receiving slots 48 can be selected.

Each protrusion 134 extends outward from a rear surface 130 of the vertical protruding bar 78. Further, each protrusion 134 is configured as a downward-facing hook that includes a top surface 148, a base surface 150, a front surface 152 and a rear surface 154. The rear surface 154 is the surface that extends downward from the base surface 150 to a bottom point 156 of the downward-facing hook. Each protrusion 134 is also sized and shaped to fit through a receiving slot 48 on the vertical receiving bar 28. Each protrusion 134 is also sized and shaped to extend outward such that it reaches the slot 48 on the inwardly spaced vertical receiving bar 28.

The row of threading holes 136 are also spaced along a longitudinal length of the vertical protruding bar 78. The threading holes 136 extends entirely through the vertical protruding bar 78 from the first side surface 124 to the second side surface 126. The row of threading holes 136 is a vertical row that includes a highest threading hole 158 and a lowest threading hole 160. In some cases, the row of threading holes 136 includes six holes. However, skilled artisans will understand that other numbers of threading holes 136 can be used.

The bottom stake portion 180 is the bottom-most point of the vertical protruding bar 78. The bottom stake portion 180 is sized and shaped to be received by a staking hole in the base panel as described herein.

Figure 17:
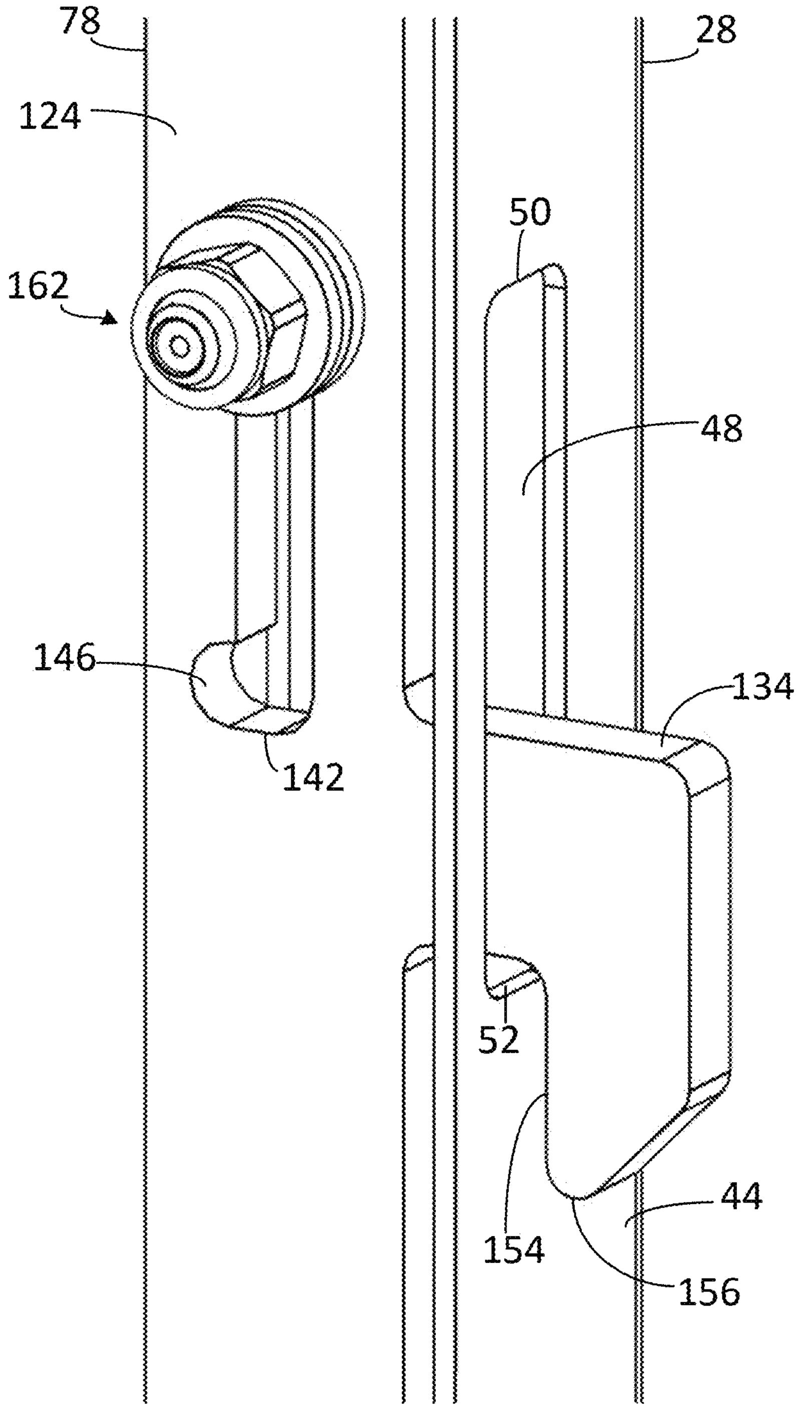
FIG. 17 is an enlarged cutout view showing a section of a vertical protruding bar of a door engaging with a section of the vertical receiving bar of a first side panel according to an embodiment.
Figure 18:
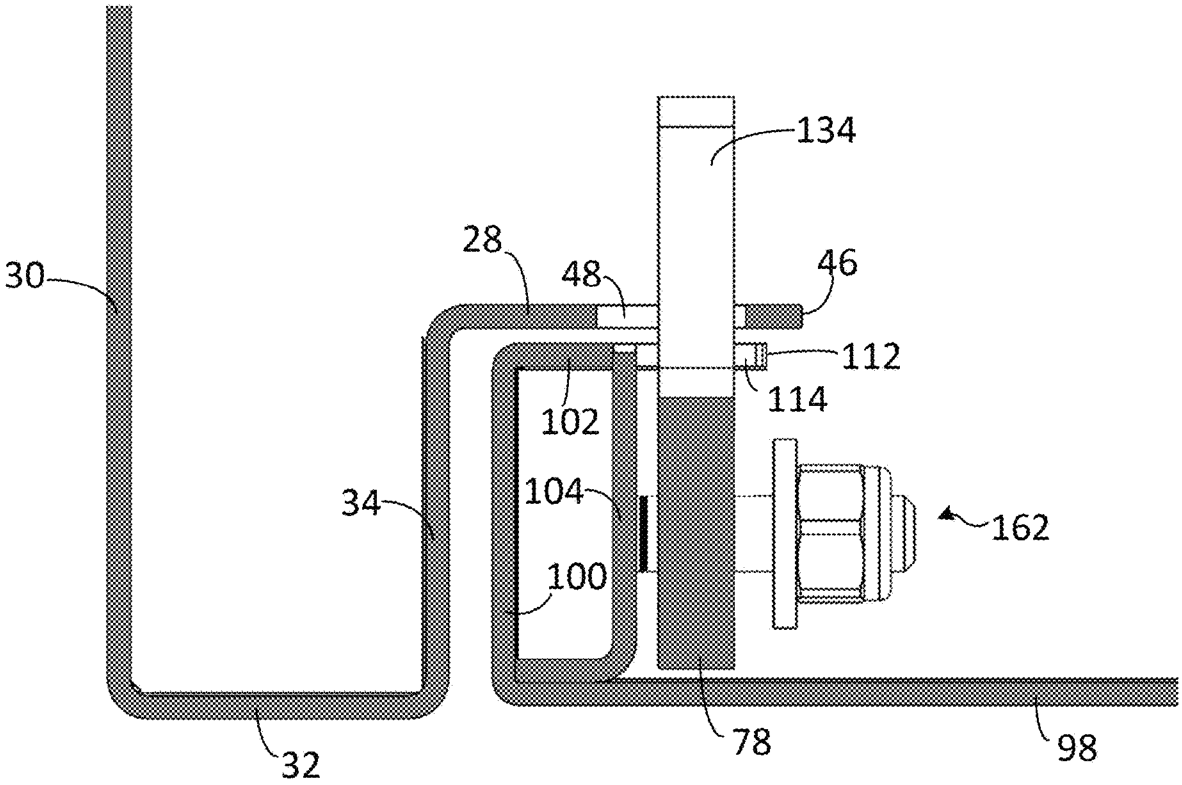
FIG. 18 is a top sectional view of certain components of a door engaged with certain components of a first side panel according to an embodiment.

Referring to FIGS. 17-18, the vertical protruding bar 78 is connected to the interior wall 104 such that it is slidable relative to the interior wall 104. For example, a plurality of bolt assemblies 162 are provided. The bolt assemblies 162 include any combination of bolts and nuts and washers. Each bolt assembly 162 extends through each slot 132 in the vertical protruding bar 78 and into the interior wall 104. The hollow space 110 also accommodates components of the bolt assembly 162. The bolt assembly 162 is fixedly secured to the interior wall 104 such that neither the bolt assembly 162 nor the interior wall 104 are movable. On the other hand, the vertical protruding bar 78 slides vertically downward and upward relative to the fixed bolt assembly 162 and to the fixed interior wall 104.

The vertical protruding bar 78 slides vertically between a raised position and a lowered position. The vertical protruding bar 78 slides downward until the top 140 of each slot 132 contacts or abuts the fixed bolt assembly 162. This places the vertical protruding bar 78 in the lowered position. Likewise, the vertical protruding bar 78 slides upward until the bottom 142 of each slot 132 contacts or abuts the fixed bolt assembly 162, which puts the vertical protruding bar 78 in the raised position. The bottom 142 of each slot 132 also includes a side extension 146 that receives the bolt assembly 162 to hold the vertical protruding bar 78 in place in the raised position.

Figure 19:
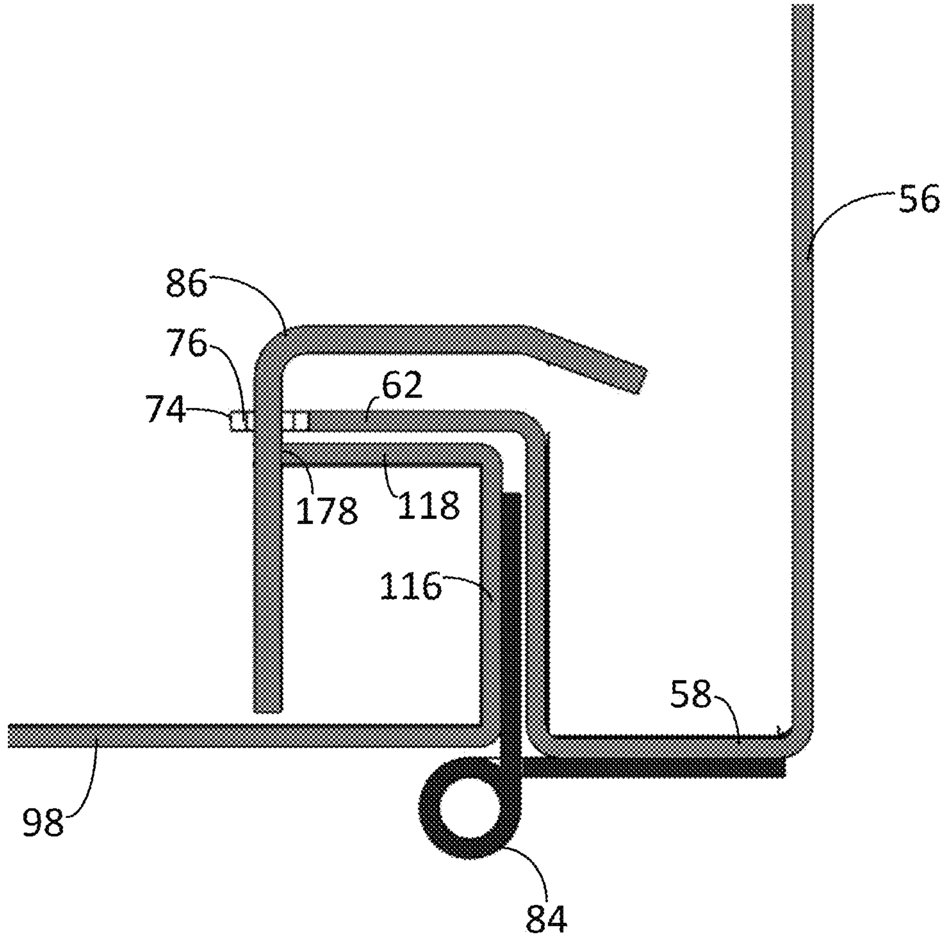
FIG. 19 is a top sectional view of certain components of a door engaged with certain components of a second side panel according to an embodiment.

FIG. 19 illustrates certain components of the door 22 engaged with certain components of the second side panel 18. The hinge 84 is connected to the side wall 116 and to the front wall 58 of the side panel 18. The hinge 84 allows the door 22 to move between an open configuration and a closed configuration. The hook 86 is integral to or welded to the exposed side edge 178 of the rear wall 118. When the door 22 is open, the hook 86 is not engaged with the second side panel 18. When the door 22 is closed, the hook 86 extends through an indent 76 on the vertical hook bar 62. The hook 86 also extends behind the vertical hook bar 62. Thus, if the hinge 84 is removed, the hook 86 prevents the door 22 from being removed from the second side panel 18.

Figure 20:
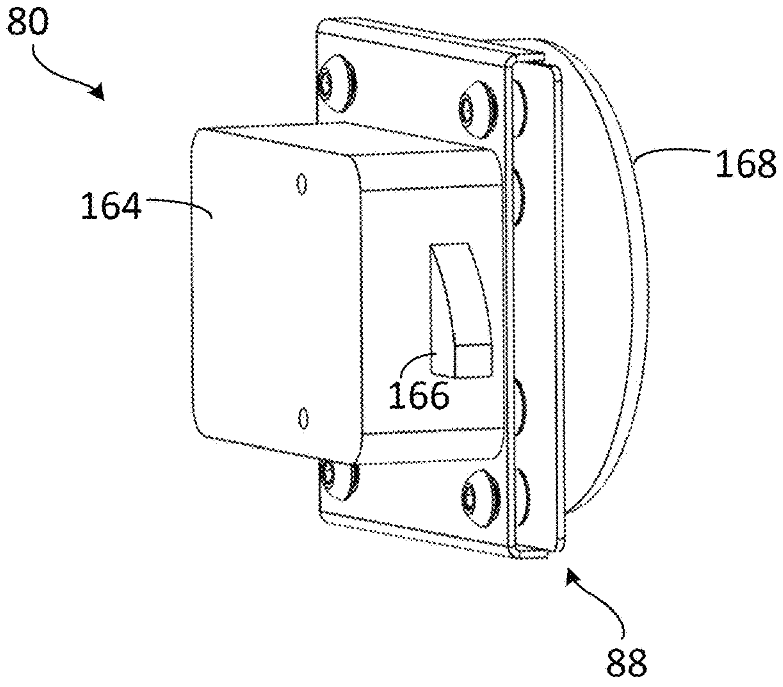
FIG. 20 is a side perspective view of certain components of a lock assembly according to an embodiment.

FIG. 20 illustrates certain components of the lock assembly 80. The lock assembly 80 includes a lock housing 164, bolt 166 and a user interface 168. The lock housing 164 houses internal components of a lock. The bolt 166 is operably connected to the internal components and moves between an extended position, where it extends outward from the lock housing 164, and a retracted position. The internal components can include any mechanical lock features known in the art to cause the bolt 166 to between an extended and retracted position relative to the lock housing 164. In some cases, the bolt 166 is a spring bolt.

The lock assembly 80 is also positioned about the front wall 98 of the door 22 so that the user interface 168 is accessible from an exterior of the safe 10 and the lock housing 164 is positioned rearward the front wall 98. The user interface 168 and the lock housing 164 can be mounted to the front wall 98 using the mounting assembly 88, which is integral to a rear of the front wall 98.

The user interface 168 is in communication with the internal lock components, so that it can communicate instructions to the internal lock components. In some cases, the user interface 168 is connected to the internal components via a cable (not shown). In other cases, the user interface 168 is wirelessly connected to the internal components. Typically, the instructions will be to "lock" the safe, thereby prompting the bolt 166 to move to the extended position, or to "unlock" the safe, thereby prompting the bolt 166 move to the retracted position.

The user interface 168 can be any interface that allows a user to input instructions. In some cases, the user interface 168 is a number pad that allows a user to enter a combination. In other cases, the user interface 168 is a fingerprint sensor that allows a user to provide a fingerprint. In yet other cases, the user interface 168 is a mechanical dial lock.

Figure 21:
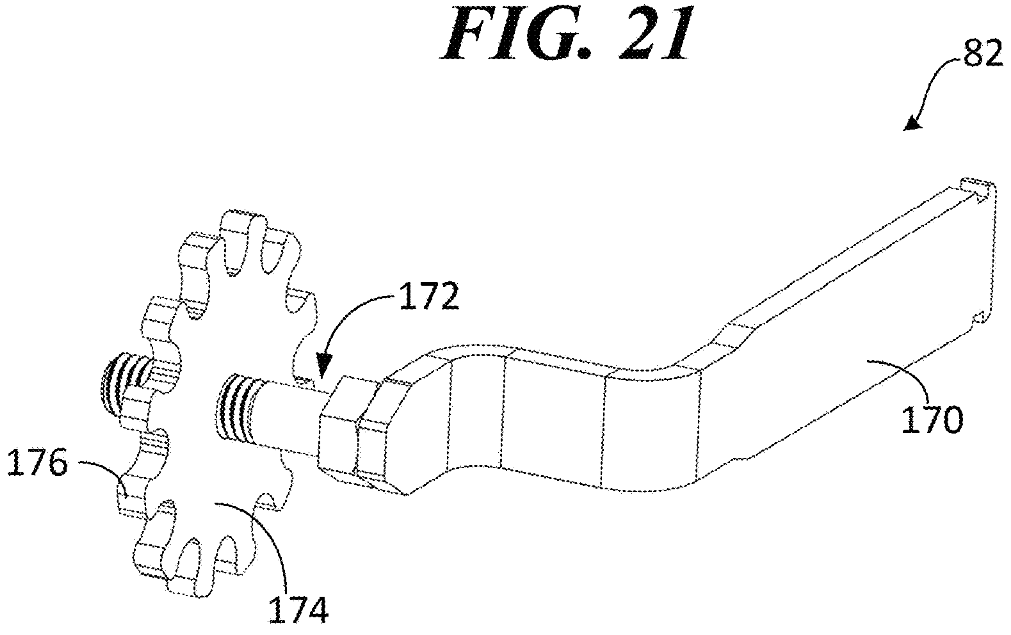
FIG. 21 is a side perspective view of certain components of a handle assembly according to an embodiment.

FIG. 21 illustrates certain components of the handle assembly 82. The handle assembly 82 includes a gripping component 170, a connecting component 172 and a teethed component 174. The gripping component 170 can be gripped by a user's hands and rotated in a clockwise direction or a counterclockwise direction. The connecting component 172 fixedly attaches the gripping component 170 to the teethed component 174 so both rotate together. In other words, when the gripping component 170 is rotated in a clockwise or counterclockwise direction, the teethed component 174 simultaneously rotates in that same direction.

The handle assembly 82 is also positioned about the front wall 98 so that gripping component 170 is accessible from an exterior of the safe 10 and the teethed component 174 is positioned rearward the front wall 98. The connecting component 172 extends through the front wall 98 and fixes the gripping component 170 to the teethed component 174. In many cases, the connecting component 172 is a bolt assembly that includes any combination of bolt, nuts and/or washers to fixedly attach the gripping component 170 to the teethed component 174.

The teethed component 174 includes a plurality of teeth 176 positioned about an outer circular circumference. In many cases, the teethed portion 174 is an external tooth lock washer. The plurality of teeth 176 are positioned to be equidistant around the outer circular circumference.

The plurality of teeth 176 rotate in a clockwise direction and a counterclockwise direction upon like rotation of the gripping component 170. The teeth 176 are sized and shaped to engage with the row of threading holes 136 on the vertical protruding bar 78 during rotation. For example, the teeth 176 and threading holes 136 can be spaced such that a single tooth engages a single threading hole during rotation.

Figure 22:
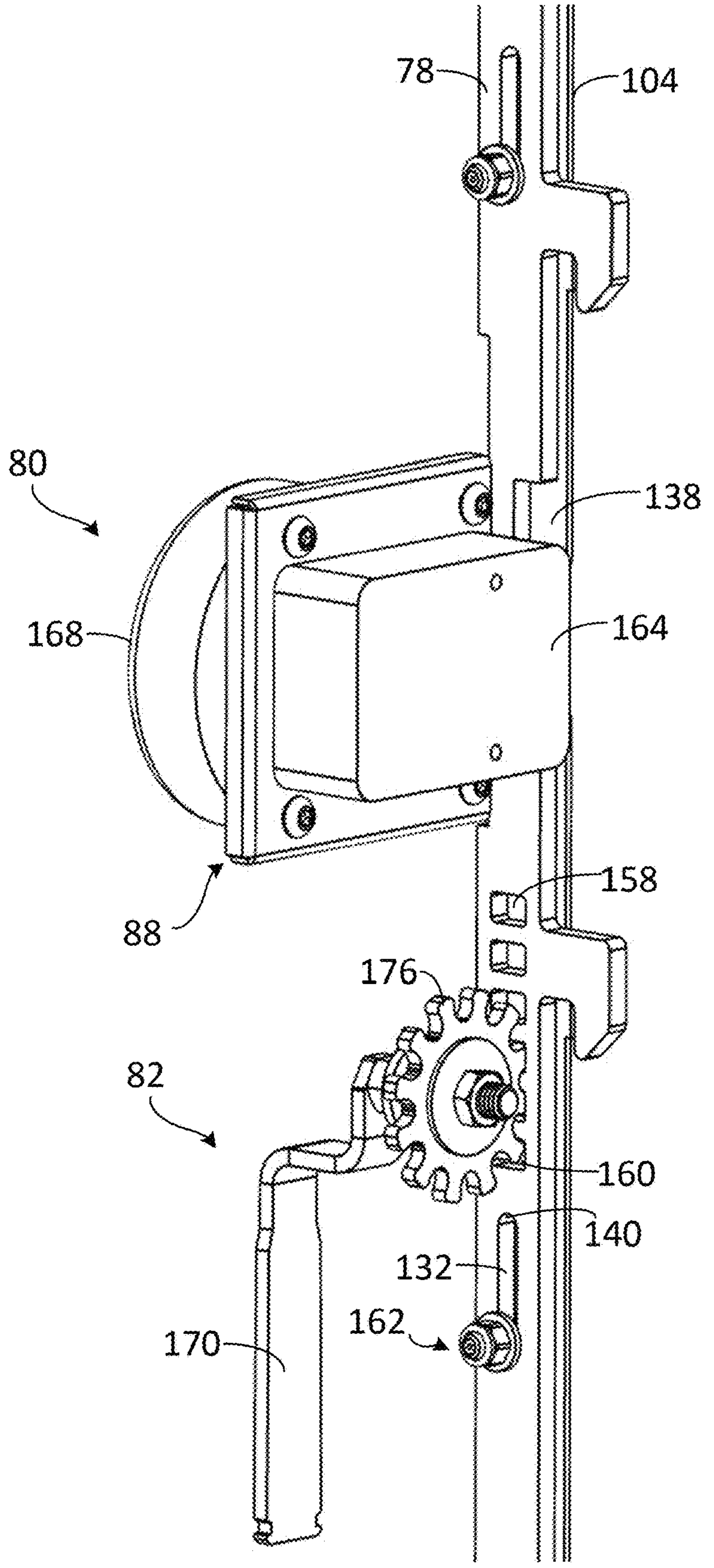
FIG. 22 is an enlarged partial rear perspective view of certain components of a door in an open configuration according to an embodiment.
Figure 23:
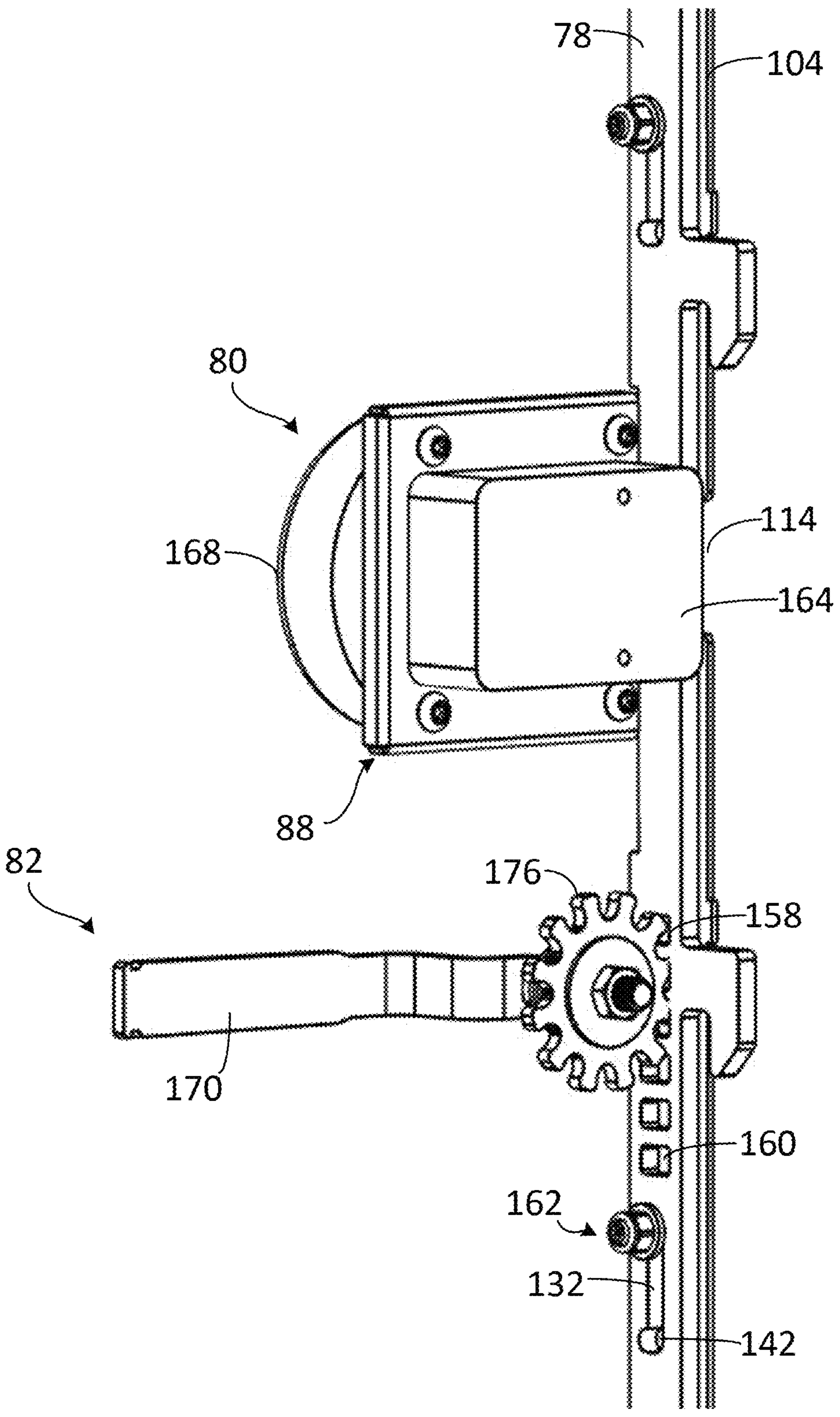
FIG. 23 is an enlarged partial rear perspective view of certain components of a door in a closed configuration according to an embodiment.
Figure 24:
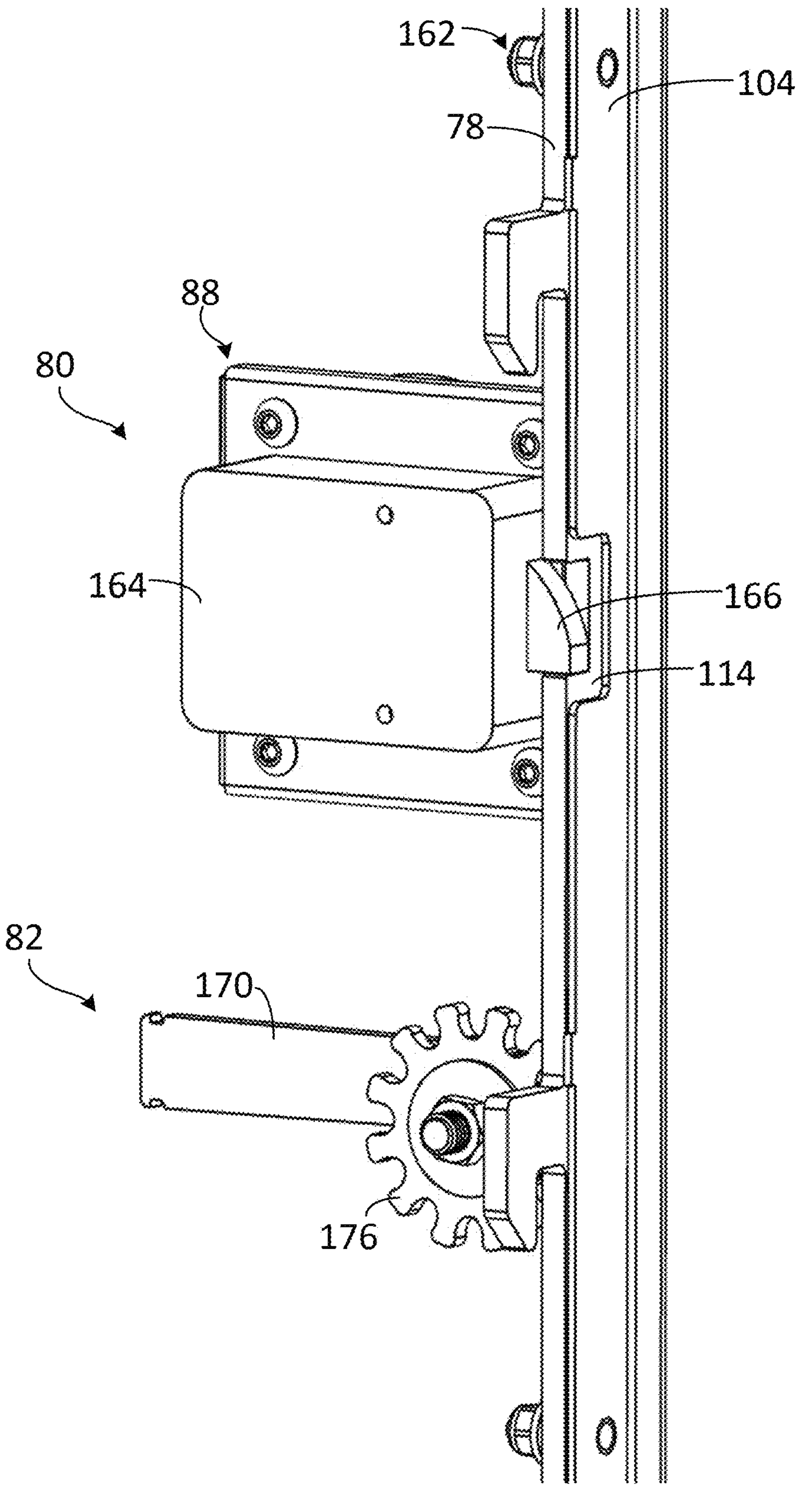
FIG. 24 is an enlarged partial rear perspective view of certain components of a door in a locked configuration according to an embodiment.

With reference to FIGS. 22-24, operation of certain components of the safe will be described to move the safe between an open configuration, closed configuration and locked configuration. Generally, in the open configuration, the door 22 is not engaged with the first side panel 16. Similarly, the vertical protruding bar 78 is also not engaged with the vertical receiving bar 28. In the closed configuration, the door 22 is engaged with the first side panel 16 but is not locked. Here, the vertical protruding bar 78 is engaged with the vertical receiving bar 28. Finally, in the locked configuration, the bolt 166 of the lock assembly 80 is engaged with the bolt recess 138 of the vertical protruding bar 78 to prevent the vertical protruding bar 78 from sliding upward or downward. This locks the door 22 to the first side panel 16.

FIG. 22 shows components of the door 22 in the open configuration. As the gripping component 170 rotates clockwise, the teeth 176 rotate downward through the row of threading holes 136. Each newly rotated tooth 176 engages with a lower threading hole than a previous tooth. This rotation continues until a tooth 176 engages the lowest threading hole 160. This places the vertical protruding bar 78 in a raised position. The gripping portion 170 can also face downward in a vertical position when the vertical protruding bar 78 is in the raised position. In such a configuration, the protrusions 134 on the vertical protruding bar 78 can freely move into and out of the slots 48 on the vertical receiving bar 28.

FIG. 23 shows components of the door 22 in the closed configuration. As the gripping portion 170 rotates counterclockwise, the teeth 176 rotate upward through the row of threading holes 136. Each newly rotated tooth 176 engages with a higher threading hole than a previous tooth. This rotation continues until a tooth 176 engages the highest threading hole 158. This places the vertical protruding bar 78 in a lowered position. The gripping portion 170 can also face sideward in a horizontal position when the vertical protruding bar 78 is in the lowered position. In this configuration, the protrusions 134 on the vertical protruding bar 78 are engaged with the slots 48 on the vertical receiving bar 28, as shown best in FIG. 17. Specifically, the base surface 150 of each protrusion 134 abuts a bottom 52 of each slot 48 of the vertical receiving bar 28. This positions the bottom point 156 such that it abuts the rear surface 44 of the vertical receiving bar 28. The bottom point 156 is then unable to move out of the slot 48. This prevents the protrusions 134 from moving out of the slots 48 and away from the vertical receiving bar 28 without maneuvering the gripping component 170 of the handle assembly 82 to raise the vertical protruding bar 78 and thus raise the bottom point 156.

FIG. 24 shows components of the door 22 in the locked configuration. In the locked configuration, the components have the same configuration of the closed configuration, except the bolt 166 is extended into the bolt recess 138 of the vertical protruding bar 78. The bolt 166 prevents the vertical protruding bar 78 from sliding upward or downward. This essentially locks the vertical protruding bar 78 in the lowered position, which in turn locks the door 22 to the first side panel 16.

Figure 25:
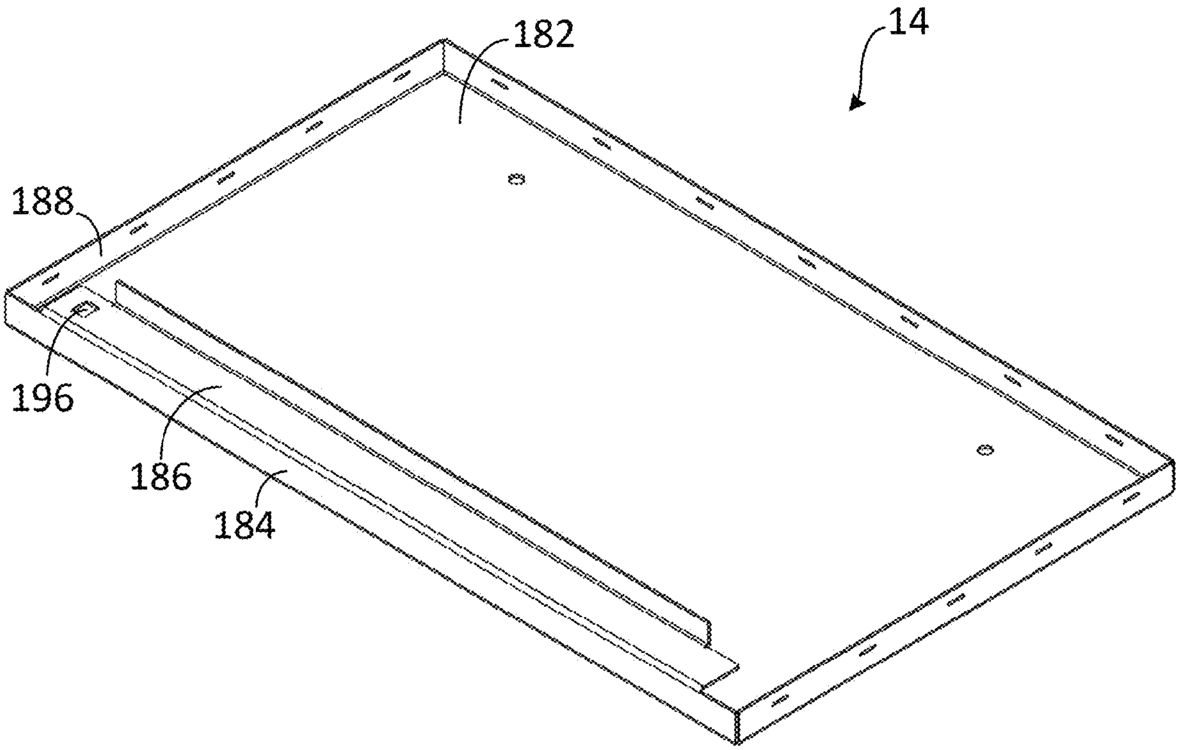
FIG. 25 is a top perspective view of certain components of a bottom panel according to an embodiment.
Figure 26:
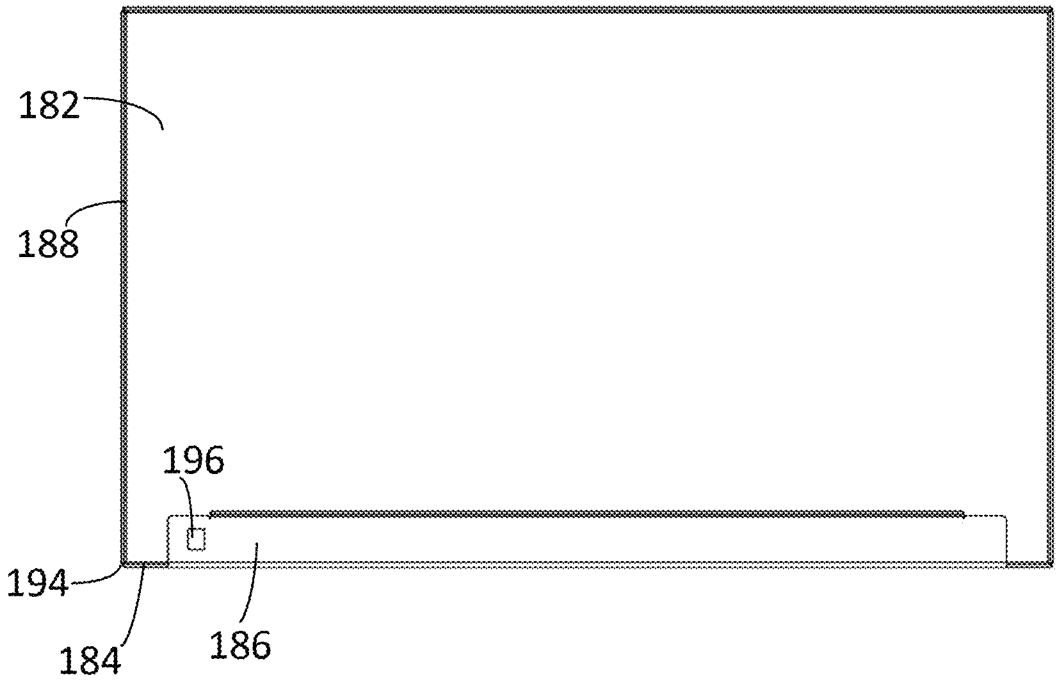
FIG. 26 is a top view of certain components of a bottom panel according to an embodiment.
Figure 27:
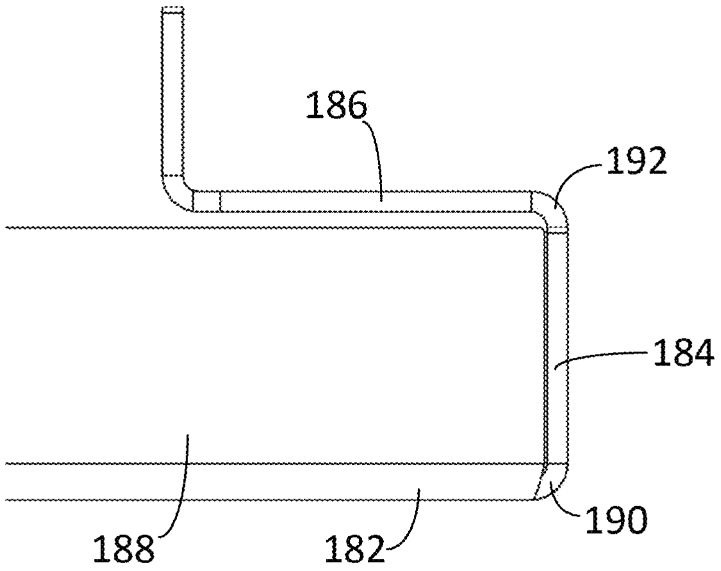
FIG. 27 is a side sectional view of a plurality of walls of a bottom panel according to an embodiment.

FIGS. 25-27 illustrate certain components of the bottom panel 14. The bottom panel 14 includes a bottom wall 182, a front wall 184, a staking plate 186 and a side wall 188. The bottom wall 182 is connected to the front wall 184 via a corner 190 and the front wall 184 is connected to the staking plate 186 via another corner 192. The front wall 184 is also connected to the side wall 188 via a corner 194. In many cases, these components are all integral to the bottom panel 14.

The bottom wall 182 and the staking plate 186 are parallel. The staking plate 186 is also perpendicular to the front wall 184. The staking plate 186 extends for a horizontal distance along the horizontal length of the front wall 184. In many cases, the staking plate 186 does not extend for the entire horizontal distance of the front wall 184. Therefore, the staking plate 186 is spaced inwardly of the side wall 188.

The staking plate 186 includes a staking hole 196 that receives a staking portion 180 of the vertical protruding bar 78. As best shown in FIG. 26, the staking hole 196 is positioned to be spaced inward the side wall 188 and inward the front wall 184. Also, as best shown in FIG. 27, the staking plate 186 is spaced higher and thus inward the bottom wall 182. This inward spacing of the staking hole 196 further enhances security of the safe 10 since it makes it harder to access the staking hole 196 when the safe 10 is locked.

Figure 28:
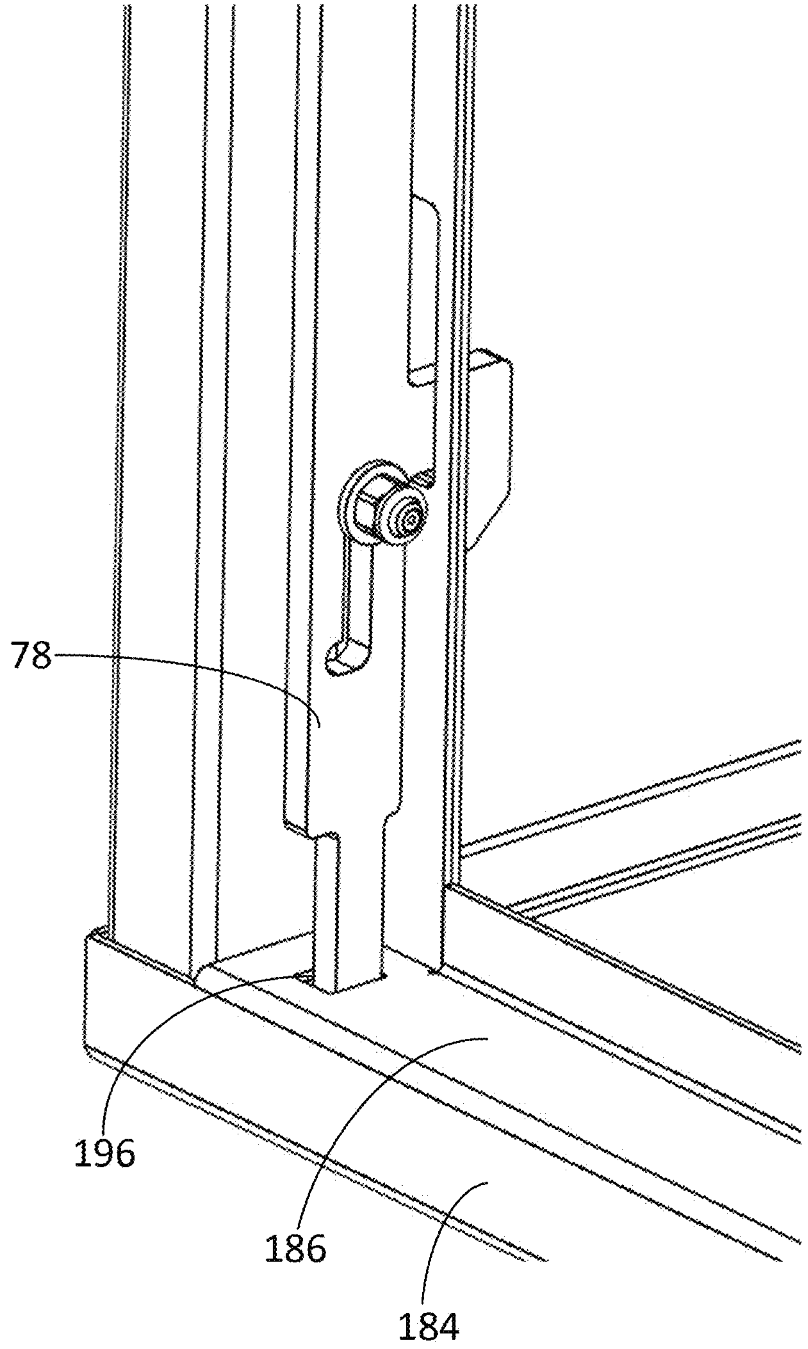
FIG. 28 is a front perspective view of a vertical protruding bar engaged with a staking hole on a staking plate according to an embodiment.

FIG. 28 illustrates the vertical protruding bar 78 engaged with the staking hole 196 on the staking plate 186. The staking portion 180 is inserted into the staking hole 196 when the vertical protruding bar 78 is in the lowered position. Should the door try to be opened, the staking portion 180 abuts surfaces of the staking hole 196 and prevents movement of the vertical protruding bar 78 and thus the door 22.

While certain embodiments have described a modular safe, skilled artisans will understand that any of the features described herein can be provided as part of a traditional safe that is not modular. In such cases, several of the panels can be provided as an integral structure. For example, in some cases, the top panel, the base pane, the rear panel, the first side panel and the second side panel can be provided as a single integral structure that engages a door.

While some preferred embodiments of the invention have been described, it should be understood that various changes, adaptations and modifications may be made therein without departing from the spirit of the invention and the scope of the appended claims.

What is claimed is:

1. A safe assembly comprising a plurality of panels, the plurality of panels comprising:
- a top panel;
- a base panel;
- a first side panel, comprising:
  - a plurality of first side panel walls comprising a first side panel side wall and a first side panel front wall; and
  - a vertical receiving bar, the vertical receiving bar being spaced inward the first side panel side wall and the first side panel front wall, the vertical receiving bar comprising a plurality of slots spaced along a longitudinal length of the vertical receiving bar;
- a second side panel;
- a door, comprising:
  - a plurality of door walls comprising a door front wall and a door side wall;
  - a vertical protruding bar, the vertical protruding bar being spaced inward the door front wall and the door side wall, the vertical protruding bar comprising a plurality of protrusions spaced along a longitudinal length of the vertical protruding bar, the plurality of protrusions being configured to insert into the plurality of slots on the vertical receiving bar, the vertical protruding bar being movable between a raised configuration and a lowered configuration, the vertical protruding bar including a row of threading holes spaced longitudinally along the longitudinal length of the vertical protruding bar;
  - a handle assembly provided in the door front wall and being operably connected to the vertical protruding bar to move the vertical protruding bar between the raised configuration and the lowered configuration, the handle assembly including a teethed component having a plurality of teeth positioned about an outer circular circumference of the teethed component that rotatably engage the row of threading holes to move the vertical protruding bar between the raised configuration and the lowered configuration; and
  - a lock assembly provided in the door front wall and being operably connected to the vertical protruding bar to lock the vertical protruding bar in the lowered configuration; and
  - a rear panel.

2. The safe assembly of claim 1 wherein the vertically protruding bar is a single integral piece such that the plurality of protrusions move together when the vertical protruding bar moves between the raised configuration and the lowered configuration.

3. The safe assembly of claim 1 wherein the vertical protruding bar includes a bolt recess and the lock assembly includes a bolt that extends into the bolt recess when the vertical protruding bar is in the lowered configuration.

4. The safe assembly of claim 1 wherein the door includes a door interior wall that is parallel to and spaced inward the door side wall, the vertical protruding bar being fixed to the door interior wall while being movable between the raised configuration and the lowered configuration relative to the door interior wall.

5. The safe assembly of claim 1 wherein the plurality of protrusions are configured as downward-facing hooks that extend outward from the vertical protruding bar.

6. The safe assembly of claim 1 wherein the vertical protruding bar includes a bottom stake portion and the base panel comprises:
- a plurality of base panel walls comprising a base panel side wall, a base panel front wall, and a base panel bottom wall; and
- a staking hole spaced inward the base panel side wall and the base panel front wall and is spaced higher than the base panel bottom wall; and
- wherein the bottom stake portion is sized and shaped to be received by the staking hole.

7. The safe assembly of claim 1 wherein the top panel, the base panel, the first side panel, the second side panel, the rear panel and the door panel comprises a plurality of walls formed of a single metallic material.

8. The safe assembly of claim 7 wherein the plurality of walls are devoid of an insulation layer.

9. A safe, comprising:

a plurality of panels comprising a top panel, a base panel, a first side panel, a second side panel, a rear panel and a door that are secured together to form an enclosed interior space;

the first side panel comprising a plurality of slots;

the door comprising a vertical protruding bar that extends vertically along a longitudinal axis of the door, the vertical protruding bar being movable between a raised configuration and a lowered configuration, the vertical protruding bar including a plurality of protrusions spaced along a longitudinal length of the vertical protruding bar, the plurality of protrusions moving together when the vertical protruding bar moves between the raised configuration and the lowered configuration, the plurality of protrusions being configured to move freely into and out of the plurality of slots of the first side panel when the vertical protruding bar is in the raised configuration, the plurality of protrusions configured to be locked within the plurality of slots when the vertical protruding bar is in the lowered configuration, the vertical protruding bar including a row of threading holes spaced longitudinally along the longitudinal length of the vertical protruding bar;

a handle assembly provided on the door and being operably connected to the vertical protruding bar to move the vertical protruding bar between the raised configuration and the lowered configuration, the handle assembly including a teethed component having a plurality of teeth positioned about an outer circular circumference of the teethed component that rotatably engage the row of threading holes to move the vertical protruding bar between the raised configuration and the lowered configuration; and a lock assembly provided on the door and being operably connected to lock the vertical protruding bar in the lowered configuration, thereby locking the plurality of protrusions within the plurality of slots and in turn locking the door to the first side panel.

10. The safe of claim 9 wherein the safe is a safe and the plurality of panels are removably secured together to form an enclosed interior space.

11. The safe of claim 9 wherein the top panel, the base panel, the first side panel, the second side panel and the rear panel are an integral structure.

12. The safe of claim 9 wherein the first side panel has a front wall and the plurality of slots are provided on a vertical receiving bar that is spaced inward the front wall and extends vertically along a longitudinal length of the first side panel.

13. The safe of claim 12 wherein the vertical receiving bar is integral to the first side panel.

14. The safe of claim 9 wherein the each of the plurality of protrusions are configured as a downward-facing hook, the downward-facing hook including a bottom point.

15. The safe of claim 14 wherein the bottom point moves freely into and out of the plurality of slots of the first side panel when the vertical protruding bar is in the raised configuration, and wherein the bottom point cannot move out of the plurality of slots when the vertical protruding bar is in the lowered configuration.

16. The safe of claim 9 wherein the door has a rear wall and the plurality of protrusions extend through indents in the rear wall.

17. The safe of claim 16 wherein the door has an interior wall that is perpendicular to the rear wall, the vertical protruding bar being fixed to the interior wall while being movable between the raised configuration and the lowered configuration relative to the interior wall.

18. The safe of claim 9 wherein the vertical protruding bar includes a bolt recess and the lock assembly includes a bolt that extends into the bolt recess when the vertical protruding bar is in the lowered configuration, thereby locking the vertical protruding bar in the lowered configuration.

19. The safe of claim 9 wherein each of the plurality of panels comprises a plurality of walls formed of a single metallic material.

20. The safe of claim 19 wherein each of the plurality of walls are devoid of an insulation layer.

21. The safe of claim 9 wherein the vertical protruding bar includes a bottom stake portion and the base panel comprises a staking hole that receives the bottom stake portion.

22. The safe of claim 21 wherein the base panel includes a base panel side wall, a base panel front wall, and a base panel bottom wall; and the staking hole is spaced inward the base panel side wall and the base panel front wall and is spaced higher than the base panel bottom wall.

23. A safe comprising a plurality of panels secured together to form an enclosed interior space, the plurality of panels comprising:

a top panel;

a base panel;

a first side panel, comprising:

a plurality of first side panel walls comprising a first side panel side wall and a first side panel front wall; and a vertical receiving bar, the vertical receiving bar being spaced inward the first panel side wall and the first panel front wall, the vertical receiving bar comprising a plurality of slots spaced along a longitudinal length of the vertical receiving bar;

a second side panel;

a door, comprising:

a plurality of door walls comprising a door front wall and a door side wall;

a vertical protruding bar, the vertical protruding bar being spaced inward the door front wall and the door side wall, the vertical protruding bar comprising a plurality of protrusions spaced along a longitudinal length of the vertical protruding bar, the plurality of protrusions being sized and shaped to extend into the plurality of slots on the vertical receiving bar, the vertical protruding bar being movable between a raised configuration and a lowered configuration, the vertical protruding bar including a row of threading holes spaced longitudinally along the longitudinal length of the vertical protruding bar;

a handle assembly provided in the door front wall and being operably connected to the vertical protruding bar to move the vertical protruding bar between the raised configuration and the lowered configuration, the handle assembly including a teethed component having a plurality of teeth positioned about an outer circular circumference of the teethed component that rotatably engage the row of threading holes to move the vertical protruding bar between the raised configuration and the lowered configuration; and a lock assembly provided in the door front wall and being operably connected to the vertical protruding bar to lock the vertical protruding bar in the lowered configuration; and a rear panel;

wherein the safe has an open configuration, a closed configuration and a locked configuration;

wherein in the open configuration, the vertical protruding bar is in the raised configuration;

wherein in the closed configuration, the plurality of protrusions extend into the plurality of slots and the vertical protruding bar is in the lowered configuration;

and wherein in the locked configuration, the plurality of protrusions extend into the plurality of slots, the vertical protruding bar is in the lowered configuration and the locking assembly locks the vertical protruding bar in the lowered configuration.

24. The safe of claim 23 wherein each of the plurality of protrusions is configured as downward-facing hooks having bottom points, wherein in the open configuration, the bottom points move freely into and out of the plurality of slots and wherein in the closed configuration and in the locked configuration, the bottom points abuts a surface of the vertical receiving bar and cannot move out of the plurality of slots.

25. The safe of claim 23 wherein the vertical protruding bar includes a bottom stake portion and the base panel comprises:

a plurality of base panel walls comprising a base panel side wall, a base panel front wall, and a base panel bottom wall; and a staking hole spaced inward the base panel side wall and the base panel front wall and is spaced higher than the base panel bottom wall; and wherein in the open configuration, the bottom stake portion is not received by the staking hole and in the closed configuration and in the locked configuration, the bottom stake portion is received by the staking hole.

26. The safe of claim 23 wherein the door comprises a plurality of hooks spaced inward the front door wall and the second side panel comprises:

a plurality of second side panel walls comprising a second side panel side wall and a second side panel front wall; and a vertical hook bar, the vertical hook bar being spaced inward the second side panel side wall and the second side panel front wall;

wherein in the open configuration the plurality of hooks are not engaged by the vertical hook bar and in the closed configuration and in the locked configuration, the plurality of hooks are engaged by the vertical hook bar.

27. The safe of claim 23 wherein the safe is a safe and the plurality of panels are removably secured together to form an enclosed interior space.

28. The safe of claim 23 wherein the top panel, the base panel, the first side panel, the second side panel and the rear panel are an integral structure.

29. The safe of claim 23 wherein the vertically protruding bar is a single integral piece and the plurality of protrusions move together when the vertical protruding bar moves between the raised configuration and the lowered configuration.

30. The safe of claim 23 wherein the top panel, the base panel, the first side panel, the second side panel, the rear panel and the door panel comprises a plurality of walls formed of a single metallic material.

31. The safe of claim 30 wherein the plurality of walls are devoid of an insulation layer.

* * * * *